United States Patent
Ng et al.

(10) Patent No.: US 10,735,827 B2
(45) Date of Patent: Aug. 4, 2020

(54) BROADCAST SYSTEM WITH A WATERMARK PAYLOAD

(71) Applicant: Sharp Kabushiki Kaisha, Sakai, Osaka (JP)

(72) Inventors: Sheau Ng, Camas, WA (US); Kiran Misra, Camas, WA (US); Sachin G. Deshpande, Camas, WA (US)

(73) Assignee: SHARP KABUSHIKI KAISHA, Sakai (JP)

(*) Notice: Subject to any disclaimer, the term of this patent is extended or adjusted under 35 U.S.C. 154(b) by 0 days.

(21) Appl. No.: 15/751,887

(22) PCT Filed: Aug. 12, 2016

(86) PCT No.: PCT/JP2016/003737
§ 371 (c)(1),
(2) Date: Feb. 12, 2018

(87) PCT Pub. No.: WO2017/029804
PCT Pub. Date: Feb. 23, 2017

(65) Prior Publication Data
US 2018/0242052 A1    Aug. 23, 2018

Related U.S. Application Data

(60) Provisional application No. 62/207,352, filed on Aug. 19, 2015, provisional application No. 62/266,535, filed on Dec. 11, 2015, provisional application No. 62/268,495, filed on Dec. 16, 2015, provisional application No. 62/277,896, filed on Jan. 12, 2016, (Continued)

(51) Int. Cl.
*H04N 21/8358* (2011.01)
*H04N 21/435* (2011.01)
*H04N 21/81* (2011.01)
*H04N 21/858* (2011.01)
*H04N 21/434* (2011.01)

(52) U.S. Cl.
CPC ....... *H04N 21/8358* (2013.01); *H04N 21/435* (2013.01); *H04N 21/4345* (2013.01); *H04N 21/814* (2013.01); *H04N 21/8586* (2013.01)

(58) Field of Classification Search
None
See application file for complete search history.

(56) References Cited

U.S. PATENT DOCUMENTS 8,682,280 B1    3/2014  Sennett et al.
2007/0136743 A1*  6/2007  Hasek ............... G08B 25/085
                                                        725/33

(Continued)

FOREIGN PATENT DOCUMENTS

CA    2 837 053 A1   11/2012
JP    2014-022894 A   2/2014

(Continued)

OTHER PUBLICATIONS

Official Communication issued in International Patent Application No. PCT/JP2016/003737, dated Sep. 27, 2016.

(Continued)

*Primary Examiner* — Michael R Telan
(74) *Attorney, Agent, or Firm* — Keating & Bennett, LLP

(57) ABSTRACT

A system for broadcasting that includes a watermark payload.

8 Claims, 20 Drawing Sheets

Related U.S. Application Data provisional application No. 62/310,645, filed on Mar. 18, 2016.

(56) References Cited

U.S. PATENT DOCUMENTS

| | | | |
|---|---|---|---|
| 2009/0254939 A1* | 10/2009 | Nagashio | H04N 7/173 725/33 |
| 2011/0154404 A1* | 6/2011 | Piepenbrink | H04N 5/44543 725/53 |
| 2011/0177824 A1 | 7/2011 | Hasegawa | |
| 2013/0094590 A1* | 4/2013 | Laksono | H04N 19/44 375/240.25 |
| 2014/0244514 A1 | 8/2014 | Rodriguez et al. | |
| 2015/0189486 A1 | 7/2015 | Lee et al. | |
| 2015/0372775 A1 | 12/2015 | Kwak et al. | |
| 2016/0219326 A1* | 7/2016 | Borsum | H04N 21/4363 |
| 2017/0180763 A1* | 6/2017 | Lee | H04N 21/236 |

FOREIGN PATENT DOCUMENTS

| | | |
|---|---|---|
| WO | 2014/119961 A1 | 8/2014 |
| WO | 2015/079658 A1 | 6/2015 |

OTHER PUBLICATIONS

Wang et al., "Robust emergency communications using TxID watermark of ATSC DTV system", Journal of Communications, vol. 4, No. 5, Jun. 2009, 10 pages.

* cited by examiner

```
wm_message(){                                        EA_message{                    ~808
    wm_message_id  ~802                                  EA_Expiry (26bits)   ~852
    switch(wm_message_id)  ~804                          EA_Urgency (1bit)   ~854
        ...                                              EA_message_body_present (1bit)  ~856
        case 0x05   ~806                                 reserve (4bits)   ~858
            EA_message()   ~808                          If(EA_message_body_present){   ~860
            break;   ~810                                    EA_message_ID (??bits)   ~862
    }                                                        EA_message_version (??bits)   ~864
}                                                            EA_message_text_length (8bits)   ~866
                                                             EA_message_text (8*Nbits)   ~868
                                                         }
                                                     }
```

FIG. 9

```
wm_message(){                          ← 800
    wm_message_id  ← 802
    switch(wm_message_id)  ← 804
        case 0x05  ← 806
            EA_message()  ← 808
            break;  ← 810
    }
}
```

```
                                          ← 808
EA_message{
    EA_Expiry (26bits)  ← 852
    EA_Urgency (1bit)  ← 854
    EA_Certainty_severity_code (4bits)  ← 900
    EA_message_body_present (1bit)  ← 856
    If(EA_message_body_present){  ← 860
        EA_message_ID (??bits)  ← 862
        EA_message_version (??bits)  ← 864
        EA_message_text_length (8bits)  ← 866
        EA_message_text (8*Nbits)  ← 868
    }
}
```

FIG. 10

| EA_Certainty_severity_code | Certainty | Severity |
|---|---|---|
| 00 00 | Unknown/Unlikely | Unknown/Minor |
| 00 01 | Unknown/Unlikely | Moderate |
| 00 10 | Unknown/Unlikely | Severe |
| 00 11 | Unknown/Unlikely | Extreme |
| 01 00 | Possible | Unknown/Minor |
| 01 01 | Possible | Moderate |
| 01 10 | Possible | Severe |
| 01 11 | Possible | Extreme |
| 10 00 | Likely | Unknown/Minor |
| 10 01 | Likely | Moderate |
| 10 10 | Likely | Severe |
| 10 11 | Likely | Extreme |
| 11 00 | Observed | Unknown/Minor |
| 11 01 | Observed | Moderate |
| 11 10 | Observed | Severe |
| 11 11 | Observed | Extreme |

```
wm_message(){                                              ~800
    wm_message_id                                          ~802
    switch(wm_message_id)                                  ~804
        case 0x05                                          ~806
            EA_message()                                   ~808
            break;                                         ~810
}

EA_message{                                                ~808
    EA_Expiry (32bits)                                     ~1100
    EA_Urgency (1bit)                                      ~854
    EA_message_body_present (1bit)                         ~856
    reserve (6bits)                                        ~1102
    If(EA_message_body_present){
        EA_message_ID (??bits)                             ~862
        EA_message_version (??bits)                        ~864
        EA_message_text_length (8bits)                     ~866
        EA_message_text (8*Nbits)                          ~868
    }
}
```

```
wm_message(){                    ← 800
    wm_message_id               ← 802
    switch(wm_message_id)       ← 804
        case 0x05               ← 806
            EA_message()        ← 808
            break;              ← 810
}

EA_message{                                          ← 808
    EA_Expiry (32bits)                               ← 1100
    EA_Urgency (1bit)                                ← 854
    EA_message_body_present (1bit)                   ← 856
    EA_Certainty_severity_code (4bits)               ← 900
    reserve (2bits)                                  ← 1104
    If(EA_message_body_present){                     ← 860
        EA_message_ID (??bits)                       ← 862
        EA_message_version (??bits)                  ← 864
        EA_message_text_length (8bits)               ← 866
        EA_message_text (8*Nbits)                    ← 868
    }
}
```

FIG. 13

| Syntax | No. of Bits | Format |
|---|---|---|
| content_id_message() { | | |
|    content_ID_present | 1 | bslbf |
|    channel_ID_present | 1 | bslbf |
|    reserved | 6 | '111111' |
|    if (content_ID_present) { | | |
|       content_ID_type | 5 | uimsbf |
|       valid_from_time | 32 | uimsbf |
|       valid_from_time_ms | 10 | uimsbf |
|       valid_until_present | 1 | bslbf |
|       If (valid_until_present) { | | |
|          valid_until_time | 32 | uimsbf |
|          reserved | 6 | '111111' |
|          valid_until_time_ms | 10 | uimsbf |
|       } | | |
|       if (content_ID_type==EIDR) { | | |
|          EIDR | 96 | uimsbf |
|       }else if(content_ID_type==adID) { | | |
|          adID_strlen | 8 | uimsbf |
|          adID_string() | adID_strlen*8 | ASCII char. string |
|       } else { | | |
|          reserved_field_length (N1) | 8 | Uimsbf |
|          reserved | 8*N1 | '11 |
|       } | | |
|    } | | |
|    if (channel_ID_present) { | | |
|       BSID | 16 | uimsbf |
|       reserved | 4 | '1111' |
|       major_channel_no | 10 | uimsbf |
|       minor_channel_no | 10 | uimsbf |
|    } | | |
| } | | |

A Bit Stream Syntax for the Content ID Message

FIG. 15

| Syntax | No. of Bits | Format |
|---|---|---|
| content_id_message() { | | |
|    content_ID_present | 1 | bslbf |
|    channel_ID_present | 1 | bslbf |
|    reserved | 6 | '111111' |
|    if (content_ID_present) { | | |
|       reserved | 2 | '11' |
|       content_ID_type | 5 | Uimsbf |
|       persistent_until_present | 1 | bslbf |
|       If (persistent_until_present) { | | |
|          persistent_until_time | 16 | uimsbf |
|          reserved | 6 | '111111' |
|          persistent_until_time_ms | 10 | uimsbf |
|       } | | |
|       if (content_ID_type==EIDR) { | | |
|          EIDR | 96 | uimsbf |
|       }else if(content_ID_type==adID) { | | |
|          adID_strlen | 8 | uimsbf |
|          adID_string() | adID_strlen*8 | ASCII char. string |
|       } else { | | |
|          reserved_field_length (N1) | 8 | Uimsbf |
|          reserved | 8*N1 | '11 |
|       } | | |
|    } | | |
|    if (channel_ID_present) { | | |
|       BSID | 16 | uimsbf |
|       reserved | 4 | '1111' |
|       major_channel_no | 10 | uimsbf |
|       minor_channel_no | 10 | uimsbf |
|    } | | |
| } | | |

A Bit Stream Syntax for the Content ID Message

FIG. 16

| Syntax | No. of Bits | Format |
|---|---|---|
| content_id_message() { | | |
|    content_ID_present | 1 | bslbf |
|    channel_ID_present | 1 | bslbf |
|    reserved | 6 | '111111' |
|    if (content_ID_present) { | | |
|       reserved | 3 | '111' |
|       content_ID_type | 5 | uimsbf |
|       if (content_ID_type==EIDR) { | | |
|          EIDR | 96 | uimsbf |
|       } else if (content_ID_type==adID) { | | |
|          adID_strlen | 8 | uimsbf |
|          adID_string() | adID_strlen*8 | ASCII char. string |
|       } else if (content_ID_type==0x1F) { | | |
|          format_uri_len | 8 | uimsbf |
|          format_uri_string() | format_uri_len*8 | |
|          userPrivID_len | 8 | uimsbf |
|          userPrivID_string() | userPrivID_len*8 | |
|       } else { | | |
|          reserved1_field_length (N1) | 8 | uimsbf |
|          reserved1 | 8*N1 | '11..' |
|       } | | |
|    } | | |
|    if (channel_ID_present) { | | |
|       BSID | 16 | uimsbf |
|       reserved | 4 | '1111' |
|       major_channel_no | 10 | uimsbf |
|       minor_channel_no | 10 | uimsbf |
|    } | | |
| } | | |

A Bit Stream Syntax for the Content ID Message

FIG. 17

| Syntax | No. of Bits | Format |
|---|---|---|
| content_id_message() { | | |
|     content_ID_present | 1 | bslbf |
|     channel_ID_present | 1 | bslbf |
|     reserved | 6 | '111111' |
|     if (content_ID_present) { | | |
|         reserved | 3 | '111' |
|         content_ID_type | 5 | uimsbf |
|         if (content_ID_type==EIDR) { | | |
|             EIDR | 96 | uimsbf |
|         } else if (content_ID_type==adID) { | | |
|             adID_strlen | 8 | uimsbf |
|             adID_string() | adID_strlen*8 | ASCII char. string |
|         } else if (content_ID_type==ISCI) { | | |
|             ISCI_string() | 8*8 | ASCII char. string |
|         } else if (content_ID_type==selfID) { | | |
|             selfID_strlen | 8 | uimsbf |
|             selfID_string() | selfID_strlen*8 | ASCII char. string |
|         } else if (content_ID_type==0x1F) { | | |
|             format_identifier | 32 | uimsbf |
|             userPrivID_len | 8 | uimsbf |
|             userPrivID_string() | userPrivID_len*8 | |
|         } else { | | |
|             reserved1_field_length (N1) | 8 | uimsbf |
|             reserved1 | 8*N1 | '11..' |
|         } | | |
|     } | | |
|     if (channel_ID_present) { | | |
|         BSID | 16 | uimsbf |
|         reserved | 4 | '1111' |
|         major_channel_no | 10 | uimsbf |
|         minor_channel_no | 10 | uimsbf |
|     } | | |
| } | | |

A Bit Stream Syntax for the Content ID Message

FIG. 18

| Syntax | No. of Bits | Format |
|---|---|---|
| dynamic_event_message() { | | |
|     delivery_protocol_type | 4 | uimsbf |
|     reserved | 4 | '1111' |
|     if (delivery_protocol_type == '1' \|\| '2'){ | | |
|         scheme_id_uri_length (N1) | 8 | uimsbf |
|         scheme_id_uri_string | 8*N1 | |
|         value_strlen (N2) | 8 | uimsbf |
|         value_string | 8*N2 | |
|         timescale | 32 | uimsbf |
|         presentation_time | 32 | uimsbf |
|         reserved | 6 | '111111' |
|         presentation_time_ms | 10 | |
|         duration | 32 | uimsbf |
|         id | 32 | uimsbf |
|         data_length (N3) | 8 | uimsbf |
|         data | 8*N3 | |
|     } else { | | |
|         reserved1_field_length (N1) | 8 | uimsbf |
|         reserved1 | 8*N1 | '11 |
|     } | | |
| } | | |

A Bit Stream Syntax for the Dynamic Event Message

FIG. 19

| Syntax | No. of Bits | Format |
|---|---|---|
| content_id_message() { | | |
|     content_ID_present | 1 | bslbf |
|     channel_ID_present | 1 | bslbf |
|     Reserved | 6 | '111111' |
|     if (content_ID_present) { | | |
|         Reserved | 1 | '1' |
|         valid_until_present | 1 | bslbf |
|         content_ID_type | 6 | uimsbf |
|         content_ID_length | 8 | uimsbf |
|         If (valid_until_present) { | | |
|             valid_until_time | 32 | uimsbf |
|             reserved | 6 | '111111' |
|             valid_until_time_ms | 10 | uimsbf |
|         } | | |
|         if (content_ID_type==0x01) { | | |
|             EIDR | content_ID_length*8 | uimsbf |
|         } | | |
|         else if (content_ID_type==0x02) { | | |
|             adID_string() | content_ID_length*8 | string |
|         } | | |
|         else { | | |
|             ID_value | 8*content_ID_length | var |
|         } | | |
|     } | | |
|     if (channel_ID_present) { | | |
|         BSID | 16 | uimsbf |
|         Reserved | 4 | '1111' |
|         major_channel_no | 10 | uimsbf |
|         minor_channel_no | 10 | uimsbf |
|     } | | |
| } | | |

FIG. 20

| content_ID_type value | Meaning |
|---|---|
| 0x00 | Reserved |
| 0x01 | EIDR |
| 0x02 | Ad-ID |
| 0x03-0x1F | Reserved for ATSC use |
| 0x20-0x3F | Reserved for private use |

FIG. 21

BROADCAST SYSTEM WITH A WATERMARK PAYLOAD

TECHNICAL FIELD

The present invention relates generally to a system with audio-visual content watermarking.

BACKGROUND ART

In many digital broadcasting systems, a broadcasting station transmits both streams of audio-visual (AV) content and one or more enhanced service data. The enhanced service data may be provided with the AV content to provide information and services or may be provided separately from the AV content to provide information and services.

In many broadcasting environments, the audio-visual content and the one or more enhanced service data is not received directly by an AV presentation device from the broadcasting station. Rather the AV presentation device, such as a television, is typically connected to a broadcast receiving device that receives the audio-visual content and the one or more enhanced service data in a compressed form and provides uncompressed audio-visual content to the AV presentation device.

In some broadcasting environments, the broadcast receiving device receives audio-visual content from a server (sometimes referred to as a Multichannel Video Programming Distributor (MVPD)). The MVPD receives an audio-visual broadcast signal from the broadcasting station, extracts content from the received audio-visual broadcast signal, converts the extracted content into audio-visual signals having a suitable format for transmission, and provides the converted audio-visual signals to the broadcast receiving device. During the conversion process, the MVPD often removes the enhanced service data provided from the broadcasting station or may incorporate a different enhanced service data that is provided to the broadcast receiving device. In this manner, the broadcasting station may provide the audio-visual content with enhanced service data, but the enhanced service data, if any, that is ultimately provided to the AV presentation device and/or the broadcast receiving device may not be the same as that provided by the broadcasting station.

SUMMARY OF INVENTION

Technical Problem

Since the broadcast receiving device extracts audio-visual content from the signal received from the MVPD and provides only uncompressed audio-visual data to the AV presentation device, only enhanced service data provided to the broadcast receiving device is available. Furthermore, the same enhanced service data provided by the broadcasting station may not be provided to the broadcast receiving device and/or AV presentation device.

Advantageous Effects of Invention

The foregoing and other objectives, features, and advantages of the invention will be more readily understood upon consideration of the following detailed description of the invention, taken in conjunction with the accompanying drawings.

BRIEF DESCRIPTION OF DRAWINGS

FIG. 9 illustrates an exemplary emergency alert message.

FIG. 10 illustrates another exemplary emergency alert message.

FIG. 11 illustrates an exemplary set of certainty and severity codes.

FIG. 12 illustrates another exemplary emergency alert message.

FIG. 13 illustrates another exemplary emergency alert message.

FIG. 15 illustrates a content identification message.

FIG. 16 illustrates another content identification message.

FIG. 17 illustrates another content identification message.

FIG. 18 illustrates another content identification message.

FIG. 19 illustrates a dynamic event message.

FIG. 20 illustrates another content identification message.

FIG. 21 illustrates content_id_type field information.

DESCRIPTION OF EMBODIMENTS

Definitions

A uimsbf may represent an unsigned integer most significant bit first format.

When the value in Number of bits column equals to var it represents a variable length field.

A reserved field may indicate bits corresponding to the field are reserved for future use.

hexadecimal (also base 16, or hex) refers to a positional numeral system with a radix, or base, of 16 that uses sixteen distinct symbols, most often the symbols 0-9 to represent values zero to nine, and A, B, C, D, E, F (or alternatively a, b, c, d, e, f) to represent values ten to fifteen. Hexadecimal numbers often use the prefix "0x".

$x^y$ may be used to denote an arithmetic operation corresponds to an exponentiation operation i.e. x to the power of y. In other contexts, such notation may be used for superscripting not intended for interpretation as exponentiation.

Figure 1:
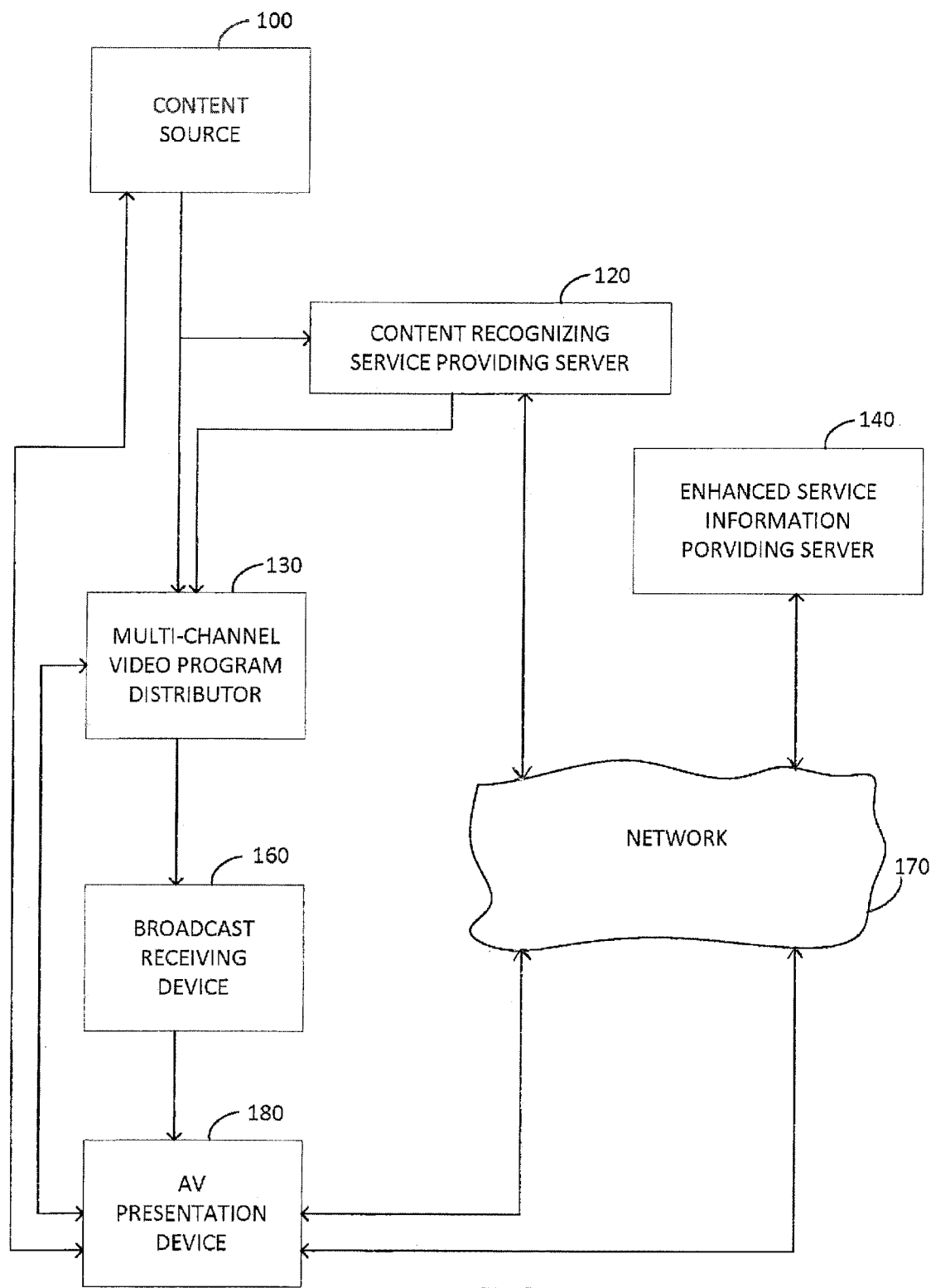
FIG. 1 illustrates a system with enhanced service information.

Referring to FIG. 1, the system may include a content source 100, a content recognizing service providing server 120, a multi-channel video program distributor 130, an enhanced service information providing server 140, a broadcast receiving device 160, a network 170, and an AV presentation device 180.

The content source 100 may correspond to a broadcasting station that broadcasts a broadcast signal including one or more streams of audio-visual content (e.g., audio and/or video). The broadcast signal may further include enhanced services data and/or signaling information. The enhanced services data preferably relates to one or more of the audio-visual broadcast streams. The enhanced data services may have any suitable format, such as for example, service information, metadata, additional data, compiled execution files, web applications, Hypertext Markup Language (HTML) documents, Extensible Markup Language (XML) documents, Cascading Style Sheet (CSS) documents, audio files, video files, Advanced Television Systems Committee (ATSC) 2.0 or future versions contents, and addresses such as Uniform Resource Locator (URL).

The content recognizing service providing server 120 provides a content recognizing service that allows the AV presentation device 180 to recognize content on the basis of audio-visual content from the content source 100. The content recognizing service providing server 120 may optionally modify the audio-visual broadcast content, such as by including a watermark. In some cases, the AV presentation device 180 is a digital video recording device.

The content recognizing service providing server 120 may include a watermark inserter. The watermark inserter may insert watermarks which are designed to carry enhanced services data and/or signaling information, while being imperceptible or at least minimally intrusive to viewers. In other cases a readily observable watermark may be inserted (e.g., readily observable may be readily visible in the image and/or readily observable may be readily audible in the audio). For example, the readily observable watermark may be a logo, such as a logo of a content provider at the upper-left or upper-right of each frame.

The content recognizing service providing server 120 may include a watermark inserter that modifies the audio-visual content to include a non-readily observable watermark (e.g., non-readily observable may be non-readily visible in the image and/or non-readily observable may be non-readily audible in the audio). For example, the non-readily observable watermark may include security information, tracking information, data, or otherwise. Another example includes the channel, content, timing, triggers, and/or URL information.

The multi-channel video program distributor 130 receives broadcast signals from one or more broadcasting stations and typically provides multiplexed broadcast signals to the broadcast receiving device 160. The multi-channel video program distributor 130 may perform demodulation and channel decoding on the received broadcast signals to extract the audio-visual content and enhanced service data. The multi-channel video program distributor 130 may also perform channel encoding on the extracted audio-visual content and enhanced service data to generate a multiplexed signal for further distribution. The multi-channel video program distributor 130 may exclude the extracted enhanced service data and/or may include a different enhanced service data.

The broadcast receiving device 160 may tune to a channel selected by a user and receive an audio-visual signal of the tuned channel. The broadcast receiving device 160 typically performs demodulation and channel decoding on the received signal to extract desired audio-visual content. The broadcast receiving device 160 decodes the extracted audio-visual content using any suitable technique, such as for example, H.264/Moving Picture Experts Group-4 advanced video coding (MPEG-4 AVC), H.265/High efficiency video coding (HEVC), Dolby AC-3, and/or Moving Picture Experts Group-2 Advanced Audio Coding (MPEG-2 AAC). The broadcast receiving device 160 typically provides uncompressed audio-visual content to the AV presentation device 180.

The enhanced service information providing server 140 provides enhanced service information to audio-visual content in response to a request from the AV presentation device 180.

The AV presentation device 180 may include a display, such as for example, a television, a notebook computer, a digital video recorder, a mobile phone, and a smart phone. The AV presentation device 180 may receive uncompressed (or compressed) audio-visual or video or audio content from the broadcast receiving device 160, a broadcast signal including encoded audio-visual or video or audio content from the content source 100, and/or encoded or decoded audio-visual or video or audio content from the multi-channel video program distributor 130. In some cases the uncompressed video and audio, may be received via an HDMI cable. The AV presentation device 180 may receive from the content recognizing service providing server 120 through the network 170, an address of an enhanced service relating to the audio-visual content from the enhanced service information providing server 140.

It is to be understood that the content source 100, the content recognizing service providing server 120, the multi-channel video program distributor 130, and the enhanced service information providing server 140 may be combined, or omitted, as desired. It is to be understood that these are logical roles. In some case some of these entities may be separate physical devices. In other cases some of these logical entities may be embodied in same physical device. For example, the broadcast receiving device 160 and AV presentation device 180 may be combined, if desired.

Figure 2:
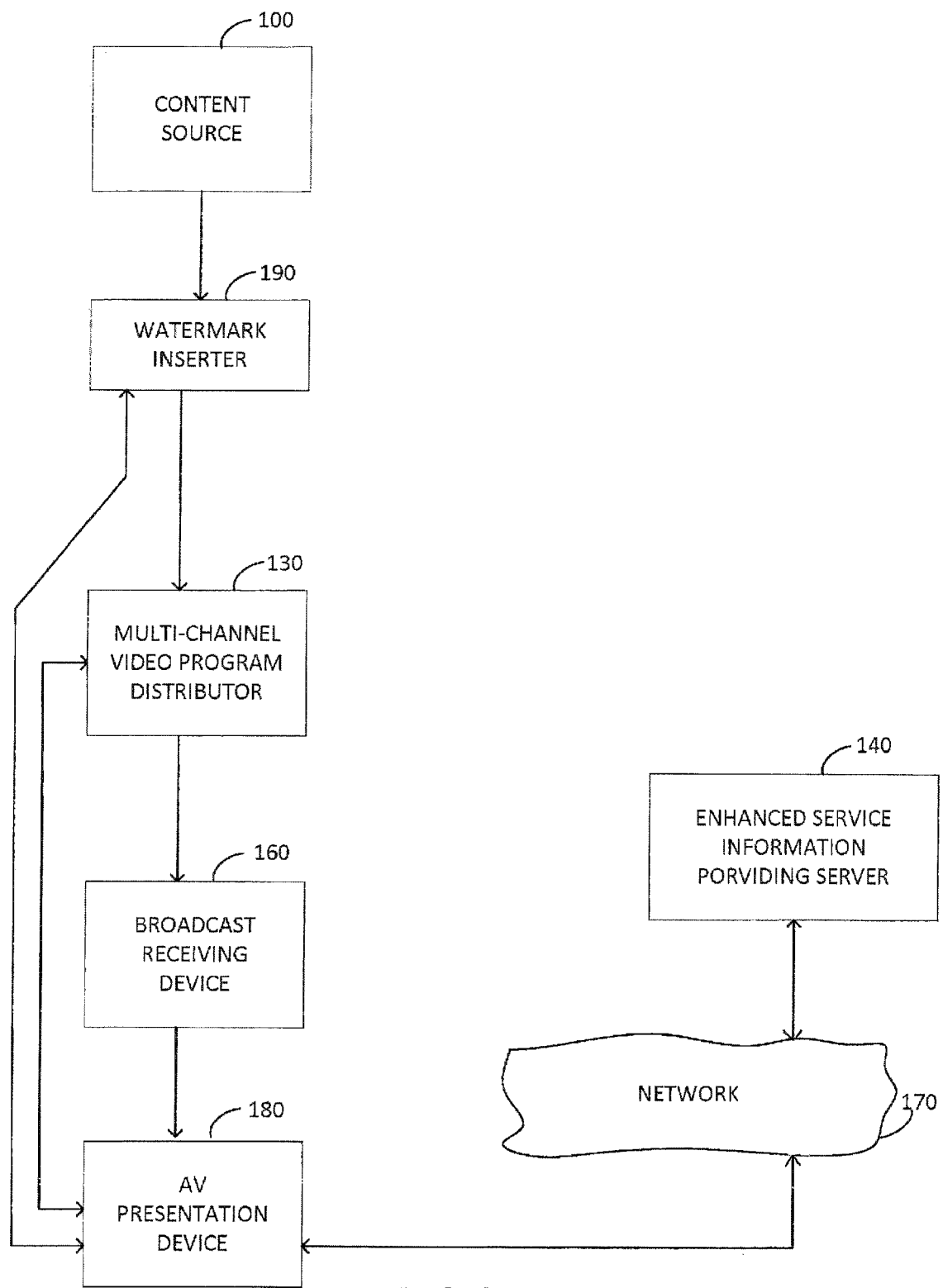
FIG. 2 illustrates another system with enhanced information.

Referring to FIG. 2, a modified system may include a watermark inserter 190. The watermark inserter 190 may modify the audio-visual (e.g., the audio and/or video) content to include additional information in the audio-visual content. The multi-channel video program distributor 130 may receive and distribute a broadcast signal including the modified audio-visual content with the watermark.

The watermark inserter 190 preferably modifies the signal in a manner that includes additional information which is non-readily observable (e.g., visually and/or audibly) in the form of digital information. In non-readily observable watermarking, the inserted information may be readily identifiable in the audio and/or video. In non-readily observable watermarking, although information is included in the audio-visual content (e.g., the audio and/or video), a user is not readily aware of the information.

One use for the watermarking is copyright protection for inhibiting illegal copying of digital media. Another use for the watermarking is source tracking of digital media. A further use for the watermarking is descriptive information for the digital media. Yet another use for the watermarking is providing location information for where additional content may be received associated with the digital media. Yet another use is to identify content and content source that is being viewed and the current time point in the content, and then allowing the device to access the desired additional functionality via an Internet connection. The watermark information is included within the audio-visual content itself, as distinguished from, meta-data that is delivered along with the audio-visual content. By way of example, the watermark information may be included by using a spread spectrum technique, a quantization technique, and/or an amplitude modulation technique.

Figure 3:
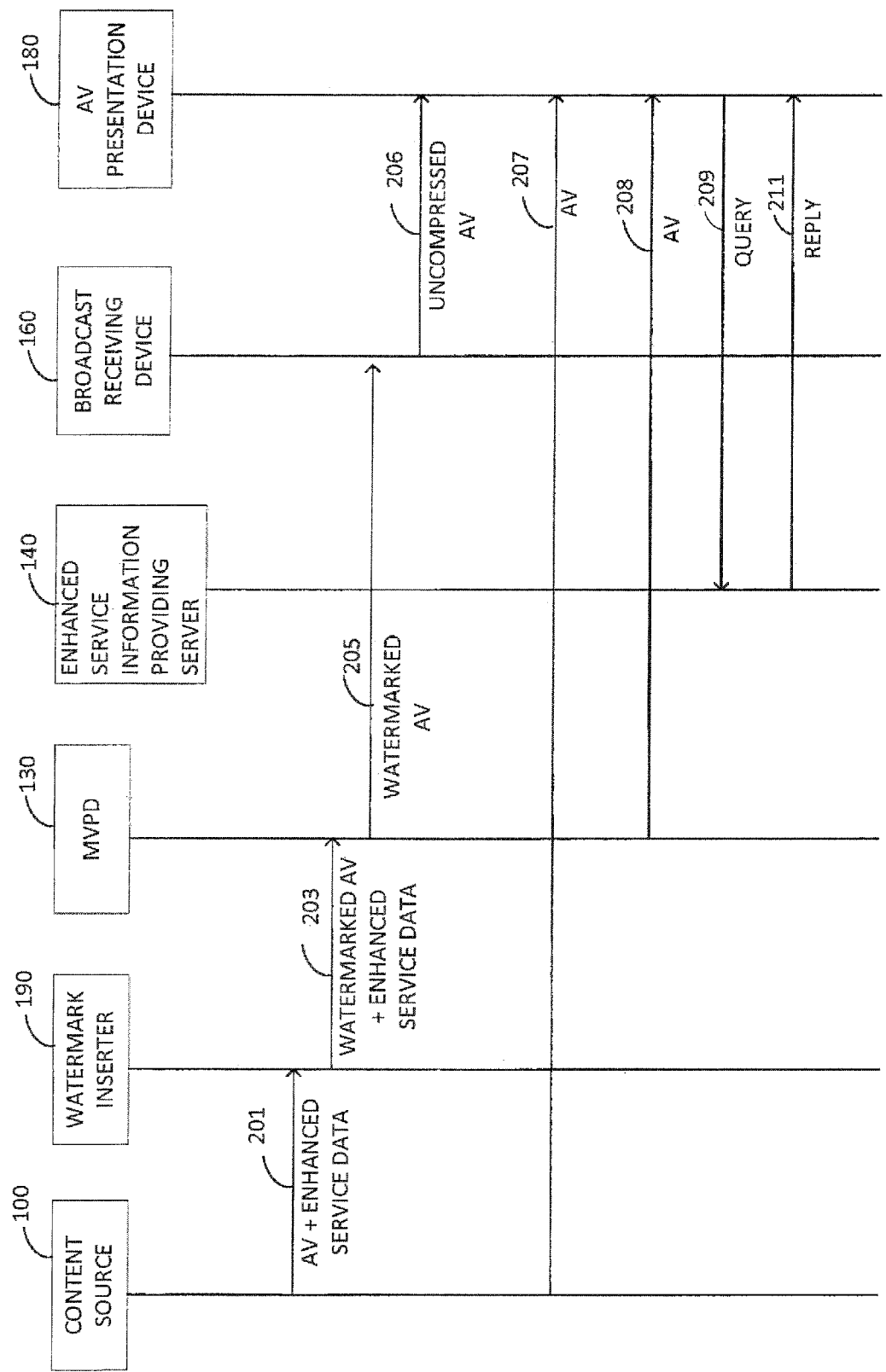
FIG. 3 illustrates a data flow for a system with enhanced information.

Referring to FIG. 3, an exemplary data flow is illustrated. The content source 100 transmits a broadcast signal including at least one audio-visual content and an enhanced service data 201 to the watermark inserter 190.

The watermark inserter 190 receives the broadcast signal that the content source 100 provides and includes a readily observable and/or a non-readily observable watermark in the audio-visual content. The modified audio-visual content with the watermark is provided together with enhanced service data 203 to the MVPD 130.

The content information associated with the watermark may include, for example, identification information of a content provider that provides audio-visual content, audio-visual content identification information, time information of a content section used in content information acquisition, names of channels through which audio-visual content is broadcasted, logos of channels through which audio-visual content is broadcasted, descriptions of channels through which the audio-visual content is broadcasted, a usage information reporting period, the minimum usage time for usage information acquisition, statistics for sporting events, display of useful information, widgets, applications, executables, and/or available enhanced service information relating to audio-visual content.

The acquisition path of available enhanced service data may be represented in any manner, such an Internet Protocol (IP) based path or Advanced Television Systems Committee—Mobile/Handheld (ATSC M/H).

The MVPD 130 receives broadcast signals including watermarked audio-visual content and enhanced data service and may generate a multiplexed signal to provide it 205 to the broadcast receiving device 160. At this point, the multiplexed signal may exclude the received enhanced service data and/or may include a different enhanced service data.

The broadcast receiving device 160 may tune to a channel that a user selects and receives signals of the tuned channel, demodulates the received signals, performs channel decoding and audio-video decoding on the demodulated signals to generate an uncompressed audio-video content, and then, provide 206 the uncompressed audio-visual content to the AV presentation device 180. The content source 100 may also broadcast 207 the audio-visual content through a channel to the AV presentation device 180. The MVPD 130 may directly transmit 208 a broadcast signal including audio-visual content to the AV presentation device 180 without going through the broadcast receiving device 160. In yet another case some of the AV information may be sent to the AV presentation device 180 over a broadband connection. In some cases this may be a managed broadband connection. In another case it may be an unmanaged broadband connection.

The AV presentation device 180 may receive uncompressed (or compressed) audio-visual content from the broadcast receiving device 160. Additionally, the AV presentation device 180 may receive a broadcast signal through a channel from the content source 100, and then, may demodulate and decode the received broadcast signal to obtain audio-visual content. Additionally, the AV presentation device 180 may receive a broadcast signal from the MVPD 130, and then, may demodulate and decode the received broadcast signal to obtain audio-visual content. The AV presentation device 180 (or broadcast receiving device 160) extracts watermark information from one or more video frames or a selection of audio samples of the received audio-visual content. The AV presentation device 180 may use the information obtained from the watermark(s) to make a request 209 to the enhanced service information providing server 140 (or any other device) for additional information. The enhanced service information providing server 140 may provide, in response thereto a reply 211.

Figure 4:
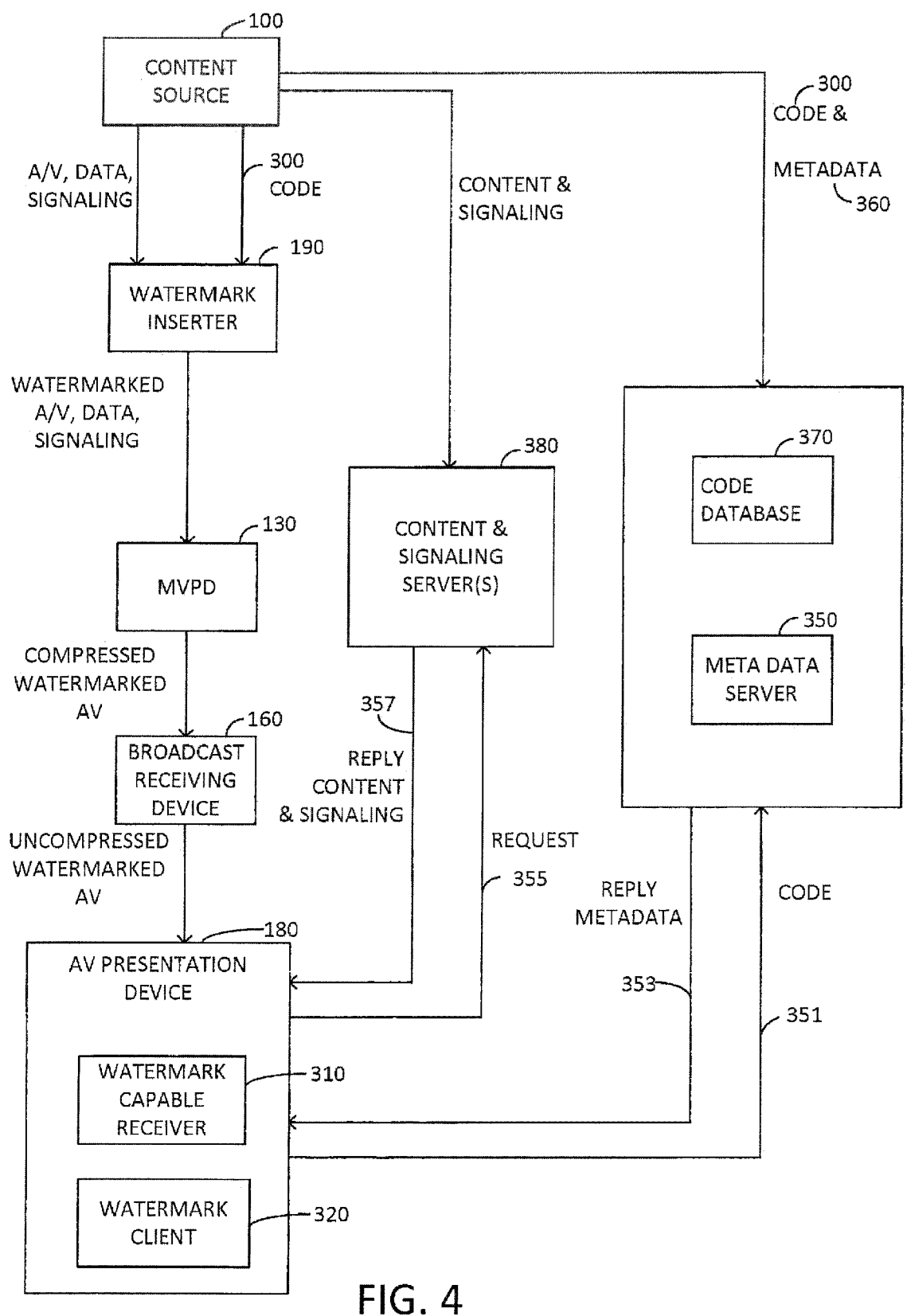
FIG. 4 illustrates another system with enhanced information.

Referring to FIG. 4, a further example includes the content source 100 that provides audio-visual content together with enhanced service data (if desired) to the watermark inserter 190. In addition, the content source 100 may provide a code 300 to the watermark inserter 190 together with the audio-visual content. The code 300 may be any suitable code to identify which, among a plurality of audio-visual streams, should be modified with the watermark. For example code=1 may identify the first audio-visual stream, code=2 may identify the second audio-visual stream, code=3 may identify the fourth audio-visual stream from ABC, code=4 may identify the fourth audio-visual stream from National Broadcasting Company (NBC), etc. The code may include temporal location information within the audio-visual content. The code may include other metadata, if desired.

The watermarked audio-visual content and associated data, signaling is provided by the watermark inserter 190 to the MVPD, which in turn may provide the watermarked compressed audio-visual content to the broadcast receiving device 160 (e.g., a set top box). The broadcast receiving device 160 may provide watermarked audio-visual content (e.g., typically uncompressed) to the AV presentation device 180. The AV presentation device 180 may include a watermark capable receiver 310 together with a watermark client 320. The watermark capable receiver 310 is suitable to detect the existence of the watermark within the audio-visual content, and to extract the watermark data from within the audio-visual content. The watermark client 320 is suitable to use the data extracted from the watermark to request additional data based thereon, and subsequently use this additional data in a suitable manner.

The AV presentation device 180 may use the code 300 from the extracted watermark to make a request to a metadata server 350. A code database 370 receives the data from the content source 100 that includes the code 300 and associated metadata 360. The code 300 and associated metadata 360 is stored in the code database 370 for subsequent use. In this manner, the code 300 that is provided to the watermark inserter 190 which is encoded within the audio-visual content is also stored in the code database 370 together with its associated metadata 360. In the event that the MVPD 130, or otherwise, removes the associated metadata or otherwise changes the associated metadata, it is recoverable by the AV presentation device 180 from the metadata server 350 which uses the provided code 351 to query the code database 370 and provide an associated response with the metadata 353 to the AV presentation device 180. The reply metadata provided by the metadata server 350 is used by the AV presentation device 180 to form a request 355 that is provided to the content and signaling server 380. The content and signaling server 380, in response to the request, provides selected content and signaling 357 to the AV presentation device 180. In general, the content and signaling server 380 may be different from the metadata server 350.

However, making a first request to the metadata server to obtain a response to the code provided, then subsequently using the metadata to provide a request to the content and signaling server 380 is burdensome, and prone to failure, due to the two different servers and/or requests that are utilized. Additionally it may increase the latency.

By way of example, the metadata may consist of one or more of the following syntax elements:

(1) location of content and signaling server (e.g., where is the server, such as its network address. Examples of network addresses are domain names, IPv4 address etc.);

(2) protocol to be used for communication with the content and signaling server (e.g., Hypertext Transfer Protocol—http, Hypertext Transfer Protocol Secure—https etc.);

(3) time code identifying a temporal location in the audio-visual content (e.g., where the metadata should be associated with in the audio-visual content);

(4) time sensitive event trigger (e.g., an advertisement or an event for a particular location in the audio-visual content);

(5) channel identification (e.g., channel specific information; local channel content);

(6) duration over which the content and signaling server requests are randomly carried out by client (e.g., for load balancing). For brevity, this syntax element may also be referred to as duration for content server requests;

(7) etc.

The watermark(s) embedded in the audio-video content typically have a capacity to carry only a few bits of payload information when the watermarked audio-video broadcast has non-readily observable information. For relatively small payload sizes, the time code (element 3 above) and/or the location of the content and signaling server (element 1 above) tends to take on a significant percentage of the available payload leaving limited additional payload for the remaining data, which tends to be problematic.

To include sufficient metadata within the watermark, so that the time code and the location information may be provided together with additional information, it may be desirable to partition the metadata across multiple watermark payloads. Each of the watermark payloads is likewise preferably included within different portions of the audio-visual content. The data extracted from the multiple watermark payloads are combined together to form a set of desirable information to be used to make a request. In the description below the term payload may be used to indicate watermark payload. Each of the syntax elements may be included within a single payload, spanned across multiple payloads, and/or fragmented across multiple payloads. Each payload may be assigned a payload type for purposes of identification. Further, an association may be established between multiple payloads belonging to the same or approximately the same timeline location. Also, the association may be uni-directional or bi-directional, as desired.

The desired time code data may be obtained from payload(s) that span across several temporal locations of the audio-visual content. Therefore some systems may establish rules to associate the determined time code with a particular temporal location of the audio-visual content. In an example the chosen temporal location may correspond to the temporal location at the end of a pre-determined watermark payload.

Figure 5:
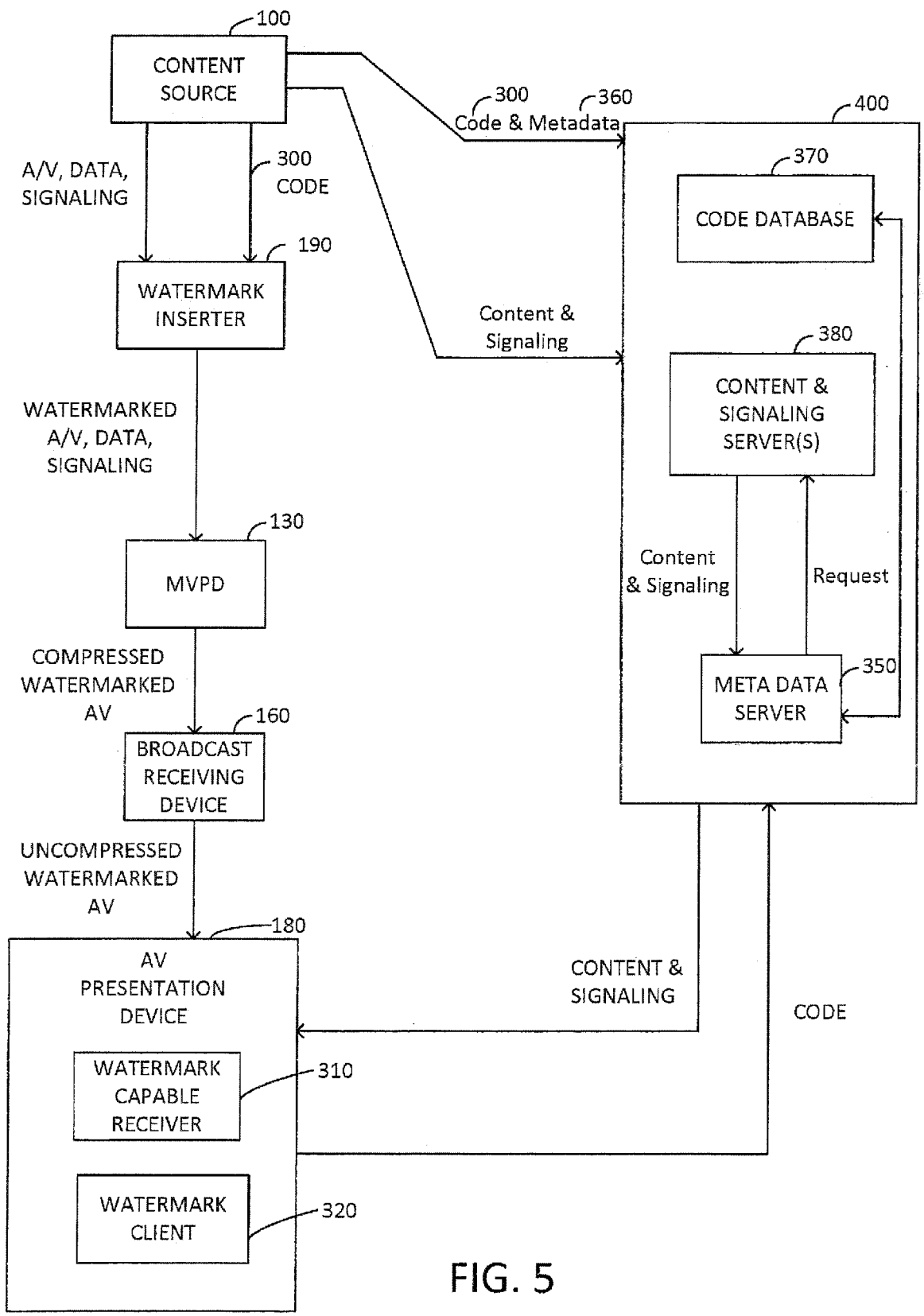
FIG. 5 illustrates another system with enhanced information.

Referring to FIG. 5, a modified system may include the content source 100, the watermark inserter 190, the MVPD 130, the broadcast receiving device 160, and the AV presentation device 180 together with its watermark capable receiver 310 and watermark client 320. The content server 400 may be modified to include the code database 370, the metadata server 350, and the content and signaling server(s) 380. The code 300 and metadata 360 is provided to the content server 400 by the content source 100. The content and signaling data is provided to the content and signaling server(s) 390.

The AV presentation device 180 may provide a code in a request based upon the decoded one or more watermarks from the audio-video broadcast. The content server 400 receives the request with the code from the AV presentation device 180. The metadata server 350 then parses the received code request and based upon information from the code database 370, makes a request to the content and signaling server(s) 390 to determine the content and signaling information which is then provided to the AV presentation device 180. In this manner, the AV presentation device 180 only needs to make a single request to a single content server 400, which in turn provides the response to the AV presentation device 180. It is to be understood that the different functions of the content server 400 may be achieved by combining the existing functions together, separating the existing functions into more components, omitting components, and/or any other technique.

Figure 6:
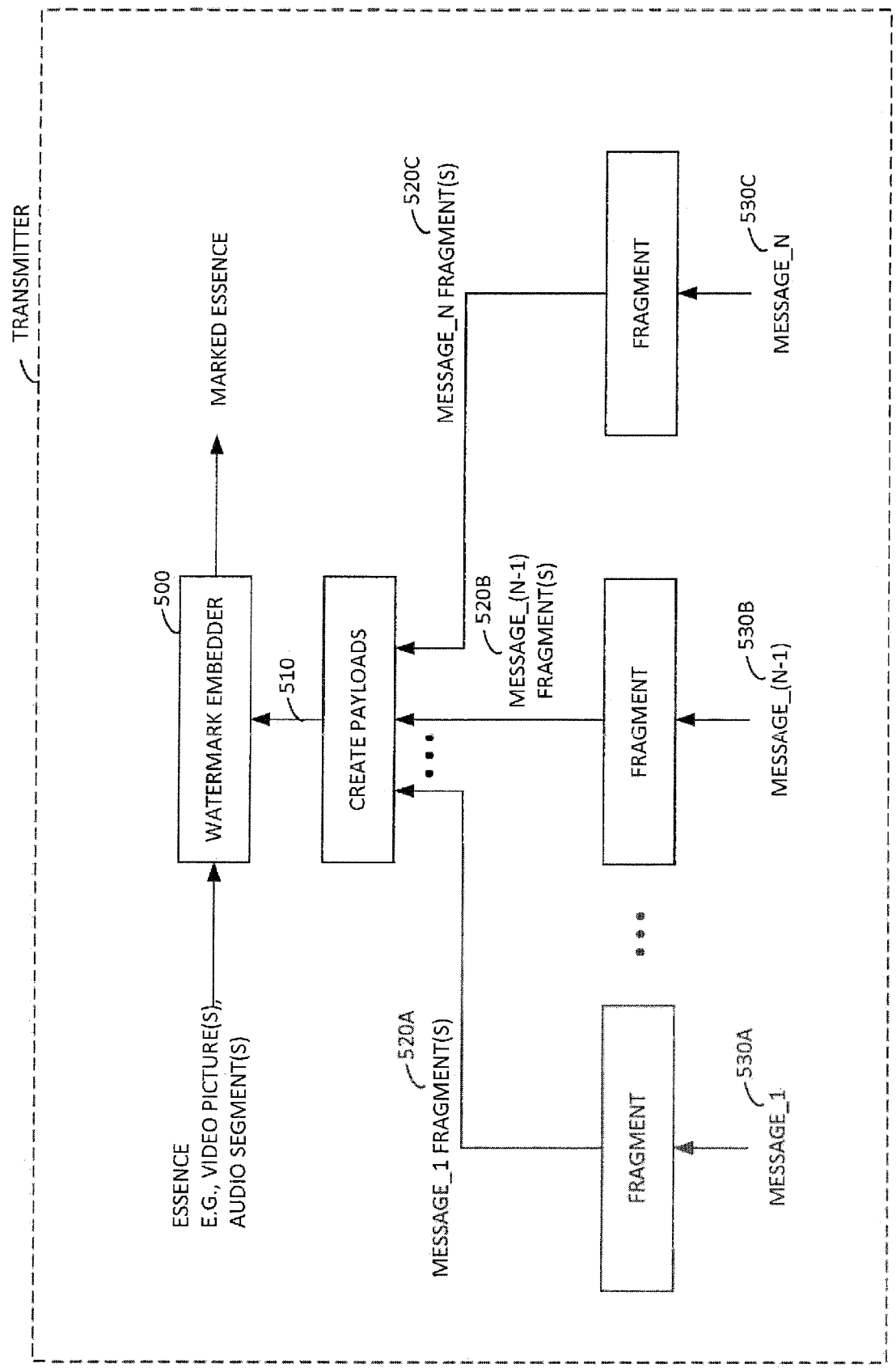
FIG. 6 illustrates a watermark embedding system.

Referring to FIG. 6, a transmitter of the system may receive one or more messages 530A, 530B, 530C that are to be embedded as a watermark into an essence (e.g., audio and/or video content). The one or more messages 530A, 530B, 530C may be packaged in the form of one or more fragments 520A, 520B, 520C. By way of example, each message may be packed in the form of a corresponding fragment. By way of example, each message may be packed in the form of one or more corresponding fragments. By way of example, a message may be partitioned each of which corresponds to a message fragment. In some cases, a message that exceeds the permitted length of a fragment may be spread into a plurality of corresponding fragments. In some cases, a long message may be spread over a plurality of corresponding fragments. In an example, each of the fragments is encoded to be transmitted only when there are no other fragments need to be transmitted. The transmitter may receive the message fragment(s) and create a series of one or more payloads 510 to be embedded within the essence. In some cases, the series may include embedding and/or sending the same message fragment(s) multiple times. In an example, one payload is embedded with one unit of the essence (e.g., one picture of the video and/or one segment of the audio). Each of the payloads 510 may include additional header and signaling information for the fragment(s). The essence, which may be for example a video picture and/or an audio segment, may be received by a watermark embedder 500 which embeds the payload 510 therein, to create a marked essence.

In an example system, it may be required that if a picture within a video segment carries a watermark then all the pictures within the video segment would carry a watermark. A receiver may then detect the loss of pictures by detecting that no watermark segment is being detected in the current video segment, whereas on an earlier occasion a picture within the video segment contained a watermark. A video segment would correspond to a group of consecutive pictures. Within a receiver a video segment may be identified by the watermark extractor by some external means.

Figure 7:
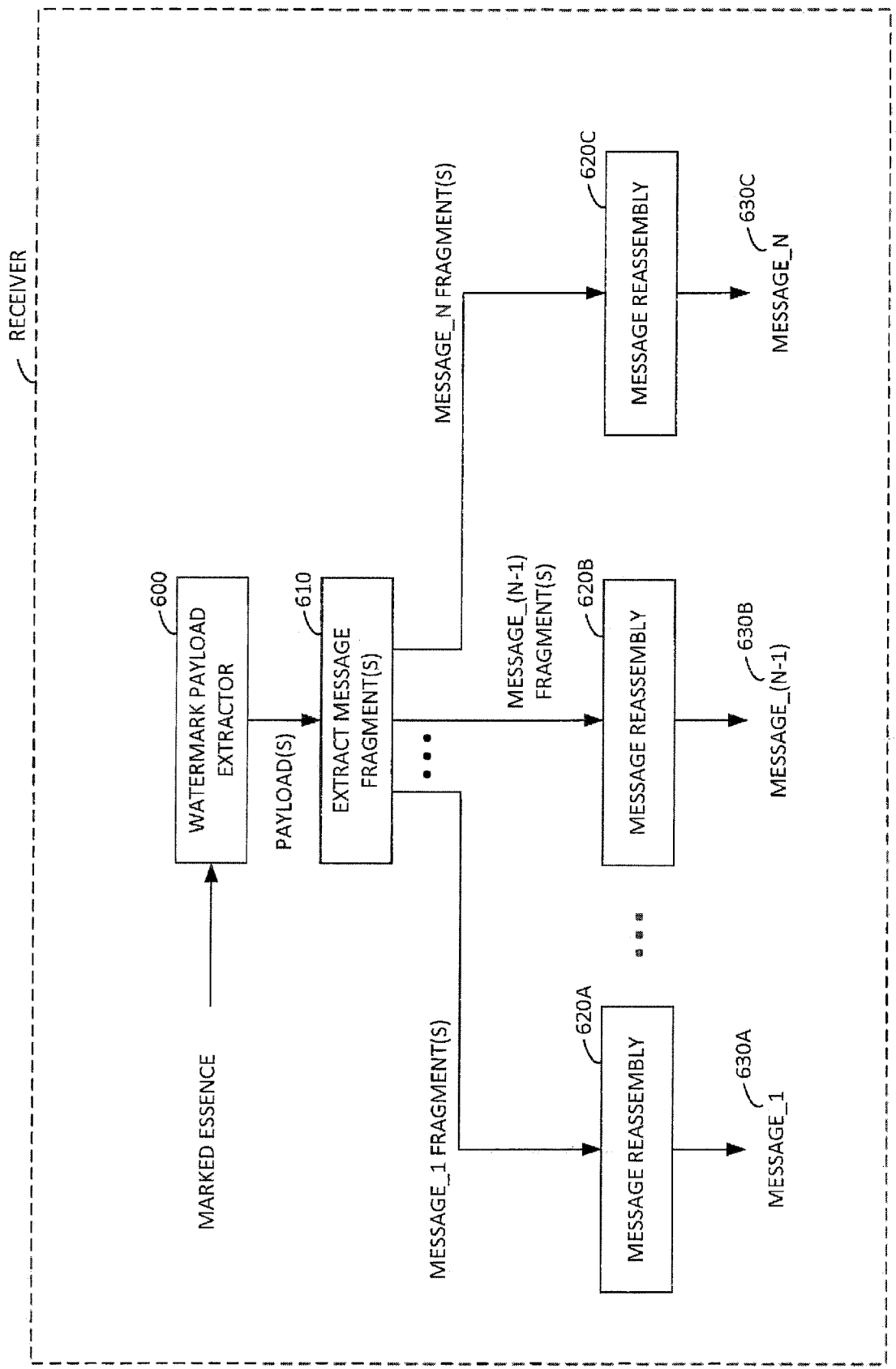
FIG. 7 illustrates a watermark extracting system.

Referring to FIG. 7, a decoder or receiver of the system may receive one or more marked essences, such as those provided by the transmitter of FIG. 6. A watermark payload extractor 600 extracts the payload(s) from the marked essence(s). One or more message fragments may be extracted 610 from the one or more payloads. The result of the extraction 610 is a series of one or more message fragments. Each of the one or more message fragments may be grouped appropriately (for .e.g. using header information of the message fragment) and input to a message reassembly 620A, 620B, 620C. The result of the message reassembly 620A, 620B, 620C is a series of messages 630A, 630B, 630C. Each of the messages 630A, 630B, 630C may be the result of the reassembly of one or more fragments, which may be the result of one or more payloads, which may be the result of one or more marked essences. In an example the extracted and reassembled Message 1 (630A), . . . , Message (N−1) (630B), Message N (630C) in FIG. 7 will be respectively identical to the Message 1 (530A), . . . , Message (N-1) (530B), Message N (530C) in FIG. 6. By way of example, message reassembly may involve concatenating, in a particular order, the message data included in a group of message fragments.

In an example, a "1X" video watermark (emission format) delivers 30 bytes of payload data per video frame, while a "2X" video watermark (emission format) system delivers 60 bytes per frame. They are sometimes referred to as the 1X System and 2X System respectively.

In an example, the payload format for the video watermark is the same in the 1X and 2X systems. The message fragment may include type information that indicates the particular type of information carried in the fragment. For example, the message type may indicate that the information includes a subset of a pre-defined set of syntax elements (e.g. content identifier, media time). In some cases, the values taken on by some syntax elements may be used to determine the exact subset of syntax elements included in the message fragment. For example, the message type may indicate that the information may include a channel identifier. For example, the message type may indicate that the information may include a uniform resource identifier (URI), and a URI type. In another example, the message type may indicate that the information include a content identifier.

In an example, a message fragment may include a content identifier which may correspond to an Entertainment Identifier Registry (EIDR). In an example, a message fragment may include a content identifier which may correspond to an advertising identifier (Ad-ID) used to track advertising assets. In an example, the message fragment may include length information about variable length information included within it. In an example, the watermark payload may include a message. In an example, the message can be included within one message fragment. In an example, a watermark payload may carry one or more message fragments. In an example, a message fragment may include length information about the variable length information included within it, for e.g. URI, Ad-ID In an example, the message fragment may include length information about a first variable length information included within the message fragment. The first variable length information may include a fixed length part and a second variable length information. The length of the second variable length information may be derived as the length of first variable length information minus the length of fixed length part. The length of the fixed length part may be derived in any suitable manner. For example, the fixed length part may be derived based upon the message type, the length of the first variable length information, the length of syntax elements belonging to a fixed length part included within the message fragment. In an example the length of part of the second variable length information included in a message fragment is derived as the length of the first variable length information minus the length of the fixed length part included in the message fragment. In an example the fixed length part included in a message fragment may not be included contiguously. In an example the fixed length part included in a message fragment may lie on either side of the second variable length information. In an example the fixed length part is only included partially within the message fragment. In an example the fixed length part may not be included within the message fragment.

In some audio-video environments it is desirable that the system has the capability to time-shift the audio-video content. Typically, this refers to recording the audio-visual content on a storage medium, such as a hard drive, and then watching the recorded show at a later time even if the recording is not yet complete. In some audio-video environments it is also desirable that the system is capable of trick mode functions, such as playback of previously recorded content, pause, pause-live, jump to next segment, jump to last segment, resume broadcast of live content, etc. In some audio-video environments it is desirable that the system has the capability to enable user preferences and interactive applications to be overridden as necessary in the event of an emergency alert (EA). Typically, emergency alerts are important messages that originate from the federal, state, or local governments that provide emergency information, such as earthquakes, floods, and other events that are national in nature and/or regional in nature. For such emergency alerts often provided with the audio visual content, it is desirable to be able to override the graphics being displayed on AV presentation device 180, such as video overlays or other graphical content, so that the emergency alert message is presented in a manner that is readily visible on the AV presentation device. For example, in the case that the viewer is watching video content on the AV presentation device such as a television together with another window open on the AV presentation device interacting with an interactive TV application, it is desirable to override the video content and/or the interactive TV application so that the emergency alert message is readily visible on the AV presentation device. Merely displaying the emergency alert message in the video content may be insufficient in some situations where the video content is obscured by another application, such as the interactive TV application. In some audio-video environments to the extent that all of the emitted broadcast services are not available to viewers from a received broadcast television service from a MVPD, such as cable, satellite, or Internet Protocol Television (IPTV) operator, the system should be capable of enabling the receivers to retrieve the missing components of the services via alternative networks (e.g., broadband network connection). Often, this may include emergency alert messages and the contents thereof, which may not be made available to a AV presentation device 180 because a broadcast receiver device 160 (e.g., set top box) receiving the audio visual content is using a high definition multimedia interface (HDMI) to the AV presentation device that only provides uncompressed audio and video information to the AV presentation device while omitting other types of components that may otherwise have been desirable to provide to the AV presentation device. It is to be understood that the AV presentation device may be any device capable of rendering audio and/or visual content, and which may be networked together in a multi-screen interactive TV session.

While presenting broadcast audio-video content that is being contemporaneously provided by a broadcaster, any emergency alert messages that are included with the audio video content, such as being embedded within a watermark included within the audio and/or video content, the AV presentation device 180 with watermark capable receiver 310 and watermark client 320 will detect and respond to the emergency alert signal. However, in the case that the viewer has time-shifted the audio-video content, when the AV presentation device 180 receives the time-shifted audio-video content together with the watermark that includes the emergency alert signal, the AV presentation device 180 will likewise detect and respond to the emergency alert signal. While such delayed detection and response may be appropriate if the shift-shifting is of a minimal duration, this may result in a disruption to the viewer experience when the time-shifting is not of a minimal duration because often the emergency alert is no longer relevant. By way of example, when the time-shifting is not of a minimal duration the AV presentation device 180 with watermark capable receiver 310 and watermark client 320 will detect and respond to the emergency alert signal which may involve modifying the video content and may involve removing any other applications that are currently being presented on the AV presentation device 180, resulting in an unnecessary disruption in the viewing experience.

Figure 8:
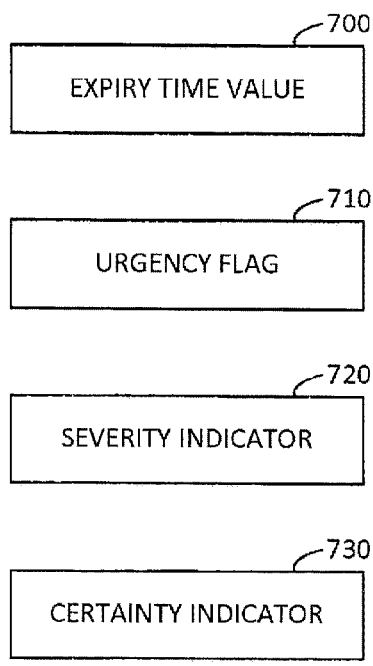
FIG. 8 illustrates an expiry time value, an urgency flag, a severity indicator, and a certainty indicator of an emergency message.

Referring to FIG. 8, it is desirable that an emergency alert watermark included within the audio and/or video content includes an expiry time value 700. The expiry time value 700 indicates a time value representative of the time extent of the corresponding emergency alert. For example, the time extent may be represented in terms of minutes in the case of audio and video watermarks, or in terms of seconds in the case of video watermarks. Preferably, the time extent is consistent with the textual content of the broadcasters' alert message. For example, a time extent until 5 PM would be appropriate for a broadcasters' alert message of "Flash Flood warning in effect till 5 pm."

It is also desirable that the emergency alert watermark included within the audio and/or video content includes an urgency flag 710. The urgency flag 710 signals to devices the extent to which immediate attention to the emergency alert is desirable. For example, if the urgency flag 710 is set then all on-screen display objects (e.g., an interactive TV application running on the AV presentation device 180, such as a television) may be cleared, even as the remainder of the emergency alert message is still being retrieved, so that the emergency alert message may be presented in a more urgent manner. For example, if the urgency flag 710 is not set, then the on-screen display objects are not necessarily cleared in such a timely manner, while the remainder of the emergency alert message is still being retrieved. In the case that the urgency flag 710 is not set, the emergency alert message may be further parsed and matched to further confirm its applicability to the current viewer. For example, the further processing may include geolocation processing to determine whether the message is applicable to the particular viewer.

It is also desirable that the emergency alert watermark included within the audio and/or video content includes a severity indicator 720. For example, the severity indicator 720 may include a range of values such as for example, extreme, severe, moderate, minor, and/or unknown. In this manner, the emergency alert signal may provide information relevant to the severity of the emergency event.

It is also desirable that the emergency alert watermark included within the audio and/or video content includes a certainty indicator 730. For example, the certainty indicator 730 may include a range of values such as for example, observed, likely, possible, unlikely, and/or unknown. In this manner, the emergency alert signal may provide information relevant to the certainty of the emergency event.

By providing the emergency alert watermark that includes the expiry time value 700, the urgency flag 710, the severity indicator 720, and/or the certainty indicator 730 enables broadcasters to flexibly signal to the receiver time-sensitive emergency alerts that are suitable for environments that include the redistribution via a MVPD broadcast receiving device 160 and/or time-shift use of audio-visual content. Preferably, the emergency alert signal that include the expiry time value 700, the urgency flag 710, the severity indicator 720, and/or the certainty indicator 730 are provided in the audio watermark and/or video watermark of the audio video content. Also, by providing the emergency alert signal that includes the expiry time value 700, the urgency flag 710, the severity indicator 720, and/or the certainty indicator 730 enables receivers to properly identify time sensitive alerts and provide a suitable response. Further, by providing the emergency alert signal that includes the expiry time value 700, the urgency flag 710, the severity indicator 720, and/or the certainty indicator 730 facilitates reducing unnecessary disruption to the viewer's experience, especially in the case of time-shifted audio video content. Moreover, by providing the emergency alert signal that includes the expiry time value 700, the urgency flag 710, the severity indicator 720, and/or the certainty indicator 730 provides information to the viewer so that the viewer may suitably respond to the emergency alert signal.

Referring to FIG. 9, the structure of the watermark message 800 carried in the payload of watermark technology with moderate capacity such as video watermark may include a watermark message identification (wm_message_id) 802 which indicates the type of messages signaled by the watermark message 800, such as an emergency alert signal and message. A switch 804 (switch(wm_message_id)) may be used to select an appropriate set of watermark decoding and/or processing based upon the type of wm_message_id 802. In the case that the wm_message_id is 0x05 806 indicates that the watermark message 800 includes an emergency alert (EA) signal and message (EA_message( ) 808. After receiving the EA_message( ) 808 a break 810 is provided. Other structures for the watermark message may likewise be used, as desired.

The structure of the EA_message( ) 808 may include one or more different data fields. The EA_message( ) 808 may include an EA_Expiry 852 that may be a 26-bit integer value that represents a Coordinated Unversal Time (UTC) in minutes of granularity when the current emergency message ends. An EA_Expiry value of 0 indicates that the alert end time is unknown. In the receiving device, the UTC of the current time may be compared against the UTC of the EA_Expiry 852, which if the UTC of the current time is less than or equal to the UTC of the EA_Expiry 852 then the emergency alert event is still appropriate for being processed accordingly. In the case that the EA_Expiry 852 value is 0, indicating that the alert expiry time is unknown, then the AV presentation device 180 may automatically render the alert message. The EA_Expiry 852 corresponds to the expiry time value 700.

The EA_message( ) 808 may include an EA_Urgency 854 that may be a 1-bit value that represents the urgency of the emergency alert event. A value of 1 signals to the AV presentation device 180, such as a television, that immediate attention is preferred. A value of 0 signals to the AV presentation device 180, such as a television, that the alert is of normal urgency in nature. Such AV presentation device 180 may further propagate the signal to one or more companion devices that are currently in a networked multi-screen interactive TV session with the AV presentation device 180, such as a television. The EA_Urgency 854 corresponds to the urgency flag 710.

The EA_message( ) 808 may include an EA_message_body_present 856 that may be a 1 bit value that indicates the presence of additional data related to the EA_message 808.

The EA_message( ) 808 may include a reserve 4 bits 858 of padding for byte alignment.

The EA_message( ) 808 may include a conditional statement 860 signaling the additional data related to the EA_message 808.

The additional data may include an EA_message_ID 862 which may provide an ID for the emergency alert message.

The additional data may include an EA_message_version 864 which may provide a version number for the emergency alert message.

The additional data may include an EA_message_text_length 866 which may be an 8-bit unsigned integer that gives the length of an EA_message_text 866.

The additional data may include the EA_message_text (8*N) 868 which may be a text string of the emergency alert text.

It is to be understood that the watermark message and/or any other fields therein may be structured in any suitable manner. It is to be understood that fewer and/or greater number of bits may be used for the signaling. It is to be understood that the data is preferably received in the audio and/or video watermarking, but may likewise be obtained in any other manner.

Referring to FIG. 10, another example for signaling a watermark message within video may include replacing the reserve 4 bits 858 with an EA_Certainty_severity_code 900 which indicates the certainty and/or the severity of the corresponding emergency message.

Referring to FIG. 11, a table represents the different combinations of the certainty and severity. The certainty 1000 may include a range of values such as for example, observed, likely, possible, unlikely, and/or unknown. To represent the 5 values by two bits, the unknown and unlikely may be combined. The severity 1010 may include a range of values such as for example, extreme, severe, moderate, minor, and/or unknown. To represent the 5 values by two bits, the unknown and minor may be combined.

Referring to FIG. 12, another example for signaling a watermark message within video may include replacing the reserve 4 bits 858 with reserve 6 bits 1102. In addition, signaling the watermark message within the video may include replacing the EA_Expiry 852 (26 bits) with EA_Expiry 1100 (32 bits). The 32 bits provides additional granularity to more appropriately signal the UTC time code using seconds granularity.

Referring to FIG. 13, another example for signaling a watermark message within video may include replacing the reserved 6 bits 1102 with reserve 2 bits 1104. In addition, signaling the watermark message within the video may include the EA_Certainty_severity_code 900.

Figure 14:
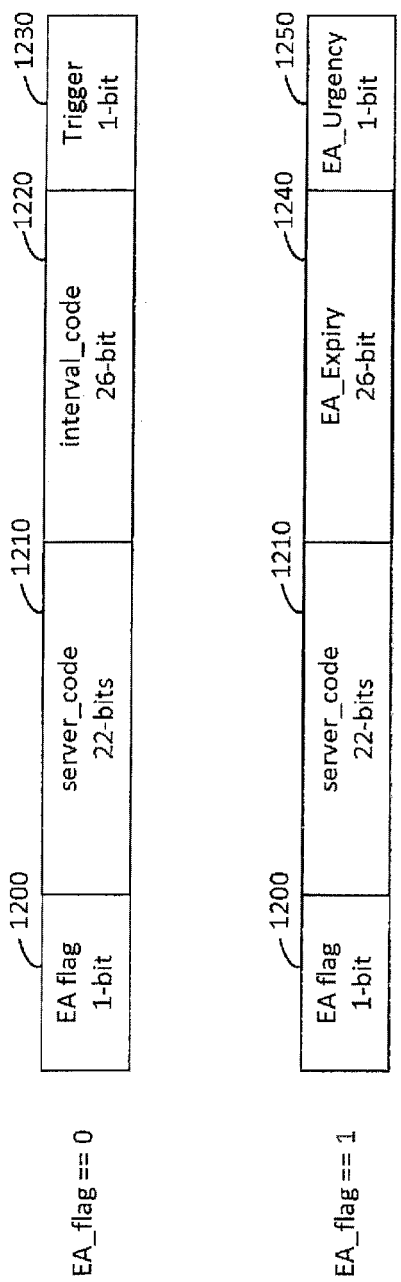
FIG. 14 illustrates another exemplary emergency alert message.

Referring to FIG. 14, the structure of the watermark message 800 included within the watermark suitable for audio content may include an emergency alert flag (EA_flag) 1200 having 1 bit which indicates the type of messages signaled by the watermark message, such as an emergency alert signal. When the EA_flag has a value of 0 then the watermark message is not of an emergency alert type. In this case, the watermark message preferably includes a server_code 1210 which may be a 22 bit code that is used to query an audio watermark server to obtain further information regarding the non-emergency alert message. The query may be of the form "http://{server_code}.vp1.tv/atsc30/interval_code, where the interval_code 1220 indicates a timeline location in the video content corresponding to the server_code 1210. A trigger 1230 may be provided to indicate that the previous one or more server_code and/or interval_code watermark data should be executed.

When the EA_flag 1200 has a value of 1 then the watermark message is of an emergency alert type. In this case, the watermark message preferably includes the server_code 1210 which may be a 22 bit code that is used to query the audio watermark server to obtain further information regarding the emergency alert message. The query may be of the form "http://{server_code}.vp1.tv/atsc30/AEA/?zip=zipcode, where the query includes the 5-digit postal ZIP code of the AV presentation device 180 with watermark capable receiver 310 and watermark client 320 to enable the server to provide the relevant emergency alert information to the such AV presentation device. The watermark message may also include EA_Expiry 1240 which may be a 22 bit code that is used to determine the expiration time. The watermark message may also include an EA_Urgency 1250 to indicate the urgency of the watermark message in a manner similar to that of EA_Urgency 854.

A system employing the audio visual watermarking may include a requirement that broadcasters who employ such watermark technology should ensure that whenever a broadcaster signals elsewhere in the emitted signal that an EA event is in effect, then the EA_flag should be correspondingly set to 1 and that the wm_message_id be correspondingly set to 0x05.

A system employing the audio visual watermarking may include a requirement that broadcasters who employ such watermark technology should ensure that whenever a broadcaster signals elsewhere in the emitted signal that there is no EA event in effect, then the EA_flag should be correspondingly set to 0 and that the wm_message_id be correspondingly not set to 0x05.

A system employing the audio visual watermarking may at the discretion of the broadcasters include setting the expiration times to 0 to alleviate the need to determine suitable time duration and/or ending time.

A system employing the audio visual watermarking may determine the expiration times based upon other elements included within the audio visual content or otherwise available to the display device.

A content identification message (e.g., Content ID) may deliver a content identifier associated with a program together with the major channel number and the minor channel number associated with the particular service. Preferably, the content identification message is not sent in fragments. One purpose of the content identification received in the message is used to report by a receiver what content was viewed. Another purpose of the content identification received in the message is it may be used by the receiver to retrieve information such as ratings, etc., from a server and take appropriate action based thereon, which may also be based upon viewer settings. Unfortunately, the receiver may take an action based upon very old content information which is then currently inappropriate to be used as the basis upon which to take an action.

In an example, a time interval for which the content ID is valid may be indicated within associated signaling. In an example, the time interval is indicated by signaling absolute start time and absolute end time. In another example, the signaling of absolute end time of the time interval is optional. In another example, the signaling of absolute start time of the time interval is optional. In an example, the time interval is indicated by signaling a negative time offset from an anchor time and a positive time offset from an anchor time. In another example, the signaling of positive offset from an anchor time is optional. In another example, the signaling of negative offset from an anchor time is optional. In an example, the start time is inferred. In an example, the end time is inferred. In an example, a start time may be indicated relative to the time the associated signaling is received. In another example, a start time may be indicated relative to the time a video, image, audio, and/or other content type containing the associated signaling is rendered, presented and/or made available to a viewer or device. In another example, an end time may be indicated relative to the time the associated signaling is received. In another example, an end time may be indicated relative to the time a video, image, audio, and/or other content type containing the associated signaling is rendered, presented, and/or made available to a viewer or device. In an example, a start time is not indicated within the associated signaling, and the start time is set equal to the time the associated signaling is received. In an example, a start time is not indicated within the associated signaling, the start time is set equal to the time a video, image, audio, and/or other content type containing the associated signaling is rendered, presented, and/or made available to a viewer or a device. In another example, the term set equal in the above denotes selecting a first value that is substantially similar, but not precisely equal, to a second value. For example, a value may be set equal to another value with a precision of milli-seconds, nano-seconds, seconds, minutes, hours, and/or years. In an example the associated signaling is the content identification message.

Referring to FIG. 15, an exemplary bit stream syntax for the content identification message is illustrated. To provide valid temporal time periods for the bit stream syntax for the content identification message the syntax preferably identifies (1) a validity start time of the content identification (valid_from_time) in seconds, (2) a second validity start time of the content identification (valid_from_time_ms) in milliseconds offset from the valid_from_time, (3) a validity end time of the content identification (valid_until_time) in seconds, and (4) a second validity end time of the content identification (valid_until_time_ms) in milliseconds offset from the valid_until_time. The syntax also preferably identifies whether a validity end time of the content identification is present (valid_until_present) so that content which does not have an end time may be identified.

The semantics of the temporal time periods may be as indicated below.

valid_from_time is a 32-bit unsigned integer that indicates the validity start time of the content ID, as the least-significant 32 bits of the count of the number of seconds since Jan. 1, 1970 00:00:00, International Atomic Time (TAI).

valid_from_time_ms is a 10-bit unsigned integer in the range 0 to 999 that indicates the milliseconds offset from the time indicated in valid_from_time, such that the formula valid_from_time+(valid_from_time_ms/1000) yields the validity start time of the content ID to the nearest 1 millisecond.

valid_until_present is a one-bit Boolean flag that indicates, when set to '1', that the field associated with validity end time of the content ID is present in the message. When set to '0', the field associated with validity end time of content ID is not present.

valid_until_time is a 32-bit unsigned integer that indicates the validity end time of content ID, as the least-significant 32 bits of the count of the number of seconds since Jan. 1, 1970 00:00:00, International Atomic Time (TAI).

valid_until_time_ms is a 10-bit unsigned integer in the range 0 to 999 that indicates the milliseconds offset from the time indicated in valid_until_time, such that the formula valid_until_time+(valid_until_time_ms/1000) yields the validity end time of content ID to the nearest 1 millisecond.

Referring to FIG. 16, another exemplary bit stream syntax for the content identification message is illustrated. To indicate the time period indicated by the content identification message, the syntax preferably identifies (1) a first persistence until time value, (2) a second persistence until time value, and (3) an indication if the persistence until information is present. In an example, the first persistence until time value contains the time value represented in seconds, and the second persistence until time value contains the number of milliseconds to be added to the first persistence until time value.

The semantics of the temporal time periods may be as indicated below.

persistent_until_present is a one-bit Boolean flag that indicates, when set to '1', that the fields persistent_until_time and persistent_until_time_ms associated with the persistence of the content ID in the content identification message content_id_message( ) is present in the message. When set to '0', fields associated with persistence of content ID in the content identification message content_id_message( ) (i.e. the fields persistent_until_time and persistent_until_time_ms) may not be present.

persistent_until_time is a 16-bit unsigned integer that indicates the time up to which the content ID in the content identification message content_id_message( ) may be valid, where the time is expressed as the number of seconds from the presentation time of the current video frame, where current video frame is the video frame containing the content ID message.

persistent_until_time_ms is a 10-bit unsigned integer in the range 0 to 999 that indicates the milliseconds offset from the time indicated in persistent_until_time value, such that the formula persistent_until_time+(persistent_until_time_ms/1000) yields the time (in seconds) from the presentation time of the current video frame up to which the content ID in the content identification message content_id_message( ) may be valid.

Please note that it is anticipated that in some examples a content identification message may be transmitted with one or more parts that are associated with one or more video frames. In this example, the presentation time of the current video frame may correspond to a pre-determined frame of the one or more video frames. For example, the presentation time of the current video frame may correspond to the first frame of the one or more video frames in presentation order. Alternatively, the presentation time of the current video frame may correspond to the last frame of the one or more video frames in presentation order.

An example content identification message may include a signaling capability to accommodate in-house content identification. Preferably, a channel_ID_type syntax includes a set of reserved field bytes following the field reserved_field_length that contains user defined content identification.

The semantics of the in-house content identification may be as indicated below.

content_ID_present is a one-bit Boolean flag that indicates, when set to '1', that the fields associated with content ID are present in the message. When set to '0', fields associated with content ID is not present.

channel_ID_present is a one-bit Boolean flag that indicates, when set to '1', that the fields associated with channel ID are present in the message. When set to '0', the fields associated with channel ID is not present.

content_ID_type may be, if desired, a 5-bit unsigned integer field that identifies the type of content identifier provided in the message coded according to the field encoding table below.

| content_ID_type field Encoding | |
|---|---|
| content_ID_type value | Meaning |
| 0x00 | Reserved |
| 0x01 | EIDR |
| 0x02 | Ad-ID |
| 0x03-0x0F | Reserved |
| 0x10-0x1F | user private. The reserved field bytes following the field reserved_field_length may contain a user defined content id. |

Alternatively, a length field and a bytes field corresponding to the length field may be defined and used for signaling user defined content id.

Alternatively, a content id length field and content id bytes field corresponding to the content id length field are defined and used for signaling user defined content id.

In an example, for user private values of content_ID_type the reserved field bytes following the field reserved_field_length may only contain a user defined content identifier.

Alternatively, reserved values may correspond to user defined content id.

In an example the range of content_ID_type values used to indicate user private is x-y, where x and y are both included. In an example x may be a value different than 0x10. In an example y may be a value different than 0x1F.

In an example a single content_ID_type value is used to indicate user private.

The content identification message may include a signaling capability to extend the syntax signaling. Preferably, a reserved_field_length (N1) and reserved syntax facilitates extensibility.

In particular, the reserved_field_length may be an 8-bit unsigned integer field that gives the length in bytes of the reserved field, which immediately follows the reserved_field_length.

In an example, in-house content identification may be referred to as house content identification.

In an example, in-house content identification may be referred to as user defined content identification.

Referring to FIG. 17, another exemplary bit stream syntax for the content identification message is illustrated. To indicate a user defined content ID (e.g. house content identification) within a content identification message, the syntax preferably identifies (1) a user private value for content ID type, (2) a length for the format field of user defined content ID, (3) a string of bytes specifying the format field of user defined content ID, (4) a length field for the user defined content ID, and/or (5) a string of bytes specifying the user defined content ID. In an example, the string of bytes specifying the user defined content ID is limited to be American Standard Code for Information Interchange (ASCII) characters. In an example, the format ID validity period information may also be included in the content ID message e.g. as a separate field, as part of the format ID field. The format ID of user defined content ID may be specified as a URI. If URNs are used for format ID of content ID then the URNs may be registered with a registration authority to avoid collisions. In an example, the URI indicating format ID of content ID includes information that indicates the URI validity period (e.g. a representation of time such as month, year etc.). If a URL is used to specify format ID of content ID then the URL may include a representation of time to indicate the format ID validity period. The format ID of a content ID may be an identifier used by a user (such as a broadcaster) for self-identification. The value of format ID field of a content ID may describe how the user defined content ID is structured. The value of format identifier field may identify a code space corresponding to user defined content ID. The value of format identifier field may allow avoiding collision of content ID values—by interpreting them based on different format identifier field values when used by different users (such as different broadcasters).

With respect to FIG. 17, an example content ID message may contain the following characteristics:

(1) a user private value of 0x1F for content ID type: may be the value 0x1F for the content_ID_type field, (2) a length for the format field of user defined content ID: may be the format_uri_len field, (3) a string of bytes specifying the format field of user defined content ID: may be the format_uri_string( )

(4) a length field for the user defined content ID: may be the userPrivID_len field, (5) a string of bytes specifying the user defined content ID: maybe hourseID_string( ) field.

The semantics of the user defined content ID may be as indicated below.

format_uri_len is a 8-bit unsigned integer that may signal the number of characters in the format_uri_string( ) to follow.

format_uri_string( ) is a URI consisting of characters whose values may be restricted to those allowed for Uniform Resource Identifiers (URIs) by RFC 3986. The length of the string may be as given by the value of format_uri_len. The character string may be a valid URI per RFC 3986. This field identifies the data in userPrivID_string( ).

userPrivID_len is an 8-bit unsigned integer that may signal the number of characters in the userPrivID_string( ) to follow.

userPrivID_string( ) is a user private string that specifies user defined content ID. The length of the string may be as given by the value of userPrivID_len.

content_ID_type, may be defined if desired, as a 5-bit unsigned integer field that identifies the type of content identifier provided in the message coded according to the field encoding table below.

| content_ID_type field Encoding | |
|---|---|
| content_ID_type value | Meaning |
| 0x00 | Reserved |
| 0x01 | EIDR |
| 0x02 (adID) | Ad-ID |
| 0x03-0x1E | Reserved |
| 0x1F | user private |

Referring to FIG. 18, another exemplary bit stream syntax for the content identification message is illustrated. To indicate a user defined content ID (e.g. house content identification) within a content identification message, the syntax preferably identifies (1) a user private value for content_ID_type, (2) a format identifier field of user defined content ID, (3) a length field for the user defined content ID, and/or (4) a string of bytes specifying the user defined content ID. In an example, the string of bytes specifying the user defined content ID is limited to be ASCII characters. The values of format ID of user defined content ID may be registered with a registration authority to avoid collisions. In an example, the format ID validity period information may also be included in the content ID message e.g. as a separate field, as part of the format ID field. The value of format identifier field may describe how the user defined content ID is structured. The value of format identifier field may identify a code space corresponding to user defined content ID. In an example, the content ID message may signal a user (e.g. broadcaster) defined content ID without a format identification. Such a user defined content ID may be identified by the originator of the ID i.e. self identification. In an example, the content ID message may signal a Industry Standard Coding Identification (ISCI) code for content.

The semantics of the user defined content ID may be as indicated below.

format_identifier is a 32-bit unsigned integer that may signal the format of the user defined content ID. In an example a registration authority such as Society of Motion Picture & Television Engineers (SMPTE) may be delegated the task of assigning format identifiers. In an example a registration authority such as ATSC may be delegated the task of assigning format identifiers.

userPrivID_len is an 8-bit unsigned integer that may signal the number of characters in the userPrivID_string( ) to follow.

userPrivID_string( ) is an ASCII character string and may represent a broadcasters house identifier for content. The length of the string may be as given by the value of userPrivID_len.

ISCI_string( ) is an ASCII character string and may represent a Industry Standard Coding Identification (ISCI) for content. The length of the string may be 8 bytes. An ISCI code is a set of 8 characters, the first four being alphabetic, and the remaining four being numeric, in the format 'ABCD1234'.

selfID_strlen is an 8-bit unsigned integer that may signal the number of characters in the selfID_string( ) to follow.

selfID_string( ) is an ASCII character string and may represent a identifier for content. The length of the string may be as given by the value of selfID_strlen. selfID_string( ) may be defined by broadcasters. In an example, selfID_string( ) assigned to multiple content may be the same, since broadcasters may independently assign the ID for content.

content_ID_type may be a 5-bit, if desired, unsigned integer field that identifies the type of content identifier provided in the message coded according to the field encoding table below.

| content_ID_type field Encoding | |
|---|---|
| content_ID_type value | Meaning |
| 0x00 | Reserved |
| 0x01 | EIDR |
| 0x02 (adID) | Ad-ID |
| 0x03 (ISCI) | ISCI code |
| 0x04 (selfID) | Self ID |
| 0x05-0x1E | Reserved |
| 0x1F | user private |

In an example userPrivID_string( ) may represent a house content ID.

In an example userPrivID_string( ) may contain a house content ID.

In an example userPrivID_string( ) may represent an ISCI code.

In an example userPrivID_string( ) may contain an ISCI code.

In an example selfID_string( ) may represent a house content ID.

In an example selfPrivID_string( ) may contain a house content ID.

In an example selfPrivID_string( ) may represent an ISCI code.

In an example selfPrivID_string( ) may contain an ISCI code.

In an example, the user defined content ID may correspond to a UUID (Universally unique identifier).

In an example, the format ID of user defined content ID may correspond to a UUID (Universally unique identifier).

Other fields of the content identification message may be as follows:

EIDR is a 96-bit (8 byte) value that is an identifier registered with EIDR (http://eidr.org/) in the "compact binary format". It may consist of a 16-bit sub-prefix generated by interpreting the sub-prefix as a binary value, and 80-bit suffix representing the non-checksum part of the suffix. It is the EIDR identifier associated with the current broadcast content.

adID_strlen is an 8-bit unsigned integer that that signals the number of characters in the adID_string( ) to follow.

adID_string( ) is an ASCII character string that represents an Ad-ID identifier registered at http://www.adid.org. The length of the string may be given by the value of adID_strlen. The length (as specified by Ad-ID) is preferably 11 or 12 characters.

BSID is a 16-bit unsigned integer field that identifies the Broadcast Stream ID of the original emission signal.

major_channel_no is a 10-bit unsigned integer field that identifies the major channel number associated with the content. The combination of major and minor channel numbers are scoped to the broadcast area.

minor_channel_no is a 10-bit unsigned integer field that identifies the minor channel number associated with the content.

Some additional constraints on particular fields may be included to provide a more efficient content identification message.

Since the allowed maximum value for the field adID_strlen is 255 the overall content_id_message( ) may become bigger than the maximum allowed capacity of the watermark 1X or 2X system. Thus constraint is described below on the field adID_strlen to make sure the overall message can fit in the capacity of watermark message when using either 1X or 2X system. Without this constraint it is possible to create a message which can not fit in the watermark system and which can result in the receiver unable to parse the received message.

Similarly since the allowed maximum value for the field reserved_field_length is 255 the overall content_id_message( ) may become bigger than the maximum allowed capacity of the watermark 1X or 2X system. Thus constraint is described below on the field reserved_field_length to make sure the overall message can fit in the capacity of watermark message when using either 1X or 2X system. Without this constraint it is possible to create a message which can not fit in the watermark system and which can result in the receiver unable to parse the received message.

The constraint may thus be defined such as follows:

At least one of content_ID_present or channel_ID_present has a value equal to '1'.

When channel_ID_present is equal to 0 and content_ID_present is equal to 1, the value of adID_strlen is less than or equal to 85 for 1X video watermark emission format (1X System) and is less than or equal to 205 for 2X video watermark emission format (2X System).

When channel_ID_present is equal to 1 and content_ID_present is equal to 1, the value of adID_strlen is less than or equal to 80 for 1X video watermark emission format (1X System) and is less than or equal to 200 for 2X video watermark emission format (2X System).

When channel_ID_present is equal to 0 and content_ID_present is equal to 1, and content_ID_type is in the range of 0x03 to 0x1F, inclusive value of reserved_field_length is less than or equal to 85 for 1X video watermark emission format (1X System) and is less than or equal to 205 for 2X video watermark emission format (2X System).

When channel_ID_present is equal to 1 and content_ID_present is equal to 1, and content_ID_type is in the range of 0x03 to 0x1F, inclusive value of reserved_field_length is less than or equal to 80 for 1X video watermark emission format (1X System) and is less than or equal to 200 for 2X video watermark emission format (2X System).

The following constraint may apply:

When channel_ID_present is equal to 0 and content_ID_present is equal to 1, the sum of the values of the format_uri_len and userPrivID_len fields may be less than or equal to 84 for 1X video watermark emission format (1X System) and is less than or equal to 204 for 2X video watermark emission format (2X System).

When channel_ID_present is equal to 1 and content_ID_present is equal to 1, the sum of the values of the format_uri_len and userPrivID_len fields may be less than or equal to 79 for 1X video watermark emission format (1X System) and is less than or equal to 199 for 2X video watermark emission format (2X System).

In an alternative example when value of content_ID_type is equal to 0x1F and syntax shown in FIG. 17 is used following constraints may apply:

When channel_ID_present is equal to 0 and content_ID_present is equal to 1, and content_ID_type is in the range of 0x03 to 0x1E inclusive value of reserved_field_length is less than or equal to 85 for 1X video watermark emission format (1X System) and is less than or equal to 205 for 2X video watermark emission format (2X System).

When channel_ID_present is equal to 1 and content_ID_present is equal to 1, and content_ID_type is in the range of 0x03 to 0x1E, inclusive value of reserved_field_length is less than or equal to 80 for 1X video watermark emission format (1X System) and is less than or equal to 200 for 2X video watermark emission format (2X System). FIG. 19 illustrates an exemplary dynamic event message.

Referring to FIG. 20, another exemplary bit stream syntax for the content identification message is illustrated. Some of the syntax elements are moved and rearranged in FIG. 20 compared to other content identification messages defined before. A common content_id_length field is moved outside the if-else part. Semantics of various elements in FIG. 20 are as follows:

content_ID_present—This one-bit Boolean flag may indicate, when set to '1', that the fields associated with "content ID" are present in the message. When set to '0', fields associated with content ID may not be present.

channel_ID_present—This one-bit Boolean flag may indicate, when set to '1', that the fields associated with "channel ID" are present in the message. When set to '0', the fields associated with channel ID may not be present.

valid_until_present—This one-bit Boolean flag may indicate, when set to '1', that the fields associated with "valid until_time" and "valid_until_time_ms" are present in the message. When set to '0', the fields associated with "valid until_time" and "valid_until_time_ms" may not be present.

content_ID_type—This 5-bit unsigned integer field may identify the type of content identifier provided in the message, coded according to FIG. 21. When using a private content_id_type, preferably the Content ID system represented by the content_id_type is unique within the broadcast service. The value of the user private Content ID could represent, for example, a House Number or some other identification system unique within the service.

content_ID_length—This 8-bit unsigned integer may signal the number of bytes in the EIDR identifier or Ad-ID identifier or other ID value to follow.

valid_until_time—This 32-bit unsigned integer may indicate the end of the validity interval of the Content ID, as the least-significant 32 bits of the count of the number of seconds since Jan. 1, 1970 00:00:00, International Atomic Time (TAI). valid_until_time_ms—This 10-bit unsigned integer in the range 0 to 999 may indicate the milliseconds offset from the time indicated in valid_until_time, such that the formula valid_until_time+(valid_until_time_ms/1000) yields the validity end time of content ID to the nearest 1 millisecond.

EIDR—This value may be an identifier registered with EIDR (http://eidr.org/), in the "compact binary format" defined by EIDR. (It consists of a 16-bit sub-prefix generated by interpreting the sub-prefix as a binary value, and 80-bit suffix representing the non-checksum part of the suffix.) It may be the EIDR identifier associated with the current broadcast content.

adID_string( )—This ASCII character string may represent an Ad-ID identifier registered at http://www.ad-id.org. The length of the string may be as given by the value of content_ID_length. (The length as specified by Ad-ID as of the date of this publication is 11 or 12 characters.)

ID_ value—This field may represent the Content Identifier (either a future ATSC-defined content identifier or a private content identifier). The length of the ID in bytes may be as given by the value of content_ID_length. The format of the field may be as given in the Content ID system in use.

BSID—This 16-bit unsigned integer field may identify the Broadcast Stream ID containing the service in the original emission signal.

major_channel_no—This 10-bit unsigned integer field may identify the major channel number of the service in the original broadcast emission. The combination of major and minor channel numbers may be scoped to the broadcast area.

minor_channel_no—This 10-bit unsigned integer field may identify the minor channel number of the service in the original broadcast emission.

Since the allowed maximum value for the field content_ID_length is 255 the overall content_id_message( ) may become larger than the maximum allowed capacity of the watermark 1X or 2X system. Thus constraints are described below on the field content_ID_length to make sure the overall message can fit in the capacity of watermark message when using either 1X or 2X system. Without this constraint it is possible to create a message which can not fit in the watermark system and which can result in the receiver unable to parse the received message.

The following constraints apply:

At least one of content_ID_present or channel_ID_present may have a value equal to '1'.

When channel_ID_present is equal to 0 and content_ID_present is equal to 1 and valid_until_present is equal to 1, the value of content_ID_length may be less than or equal to 79 for 1X video watermark emission format (1X System)

and may be less than or equal to 199 for 2X video watermark emission format (2X System).

When channel_ID_present is equal to 0 and content_ID_present is equal to 1 and valid_until_present is equal to 0, the value of content_ID_length may be less than or equal to 85 for 1X video watermark emission format (1X System) and may be less than or equal to 205 for 2X video watermark emission format (2X System).

When channel_ID_present is equal to 1 and content_ID_present is equal to 1 and valid_until_present is equal to 1, the value of contentID_length may be less than or equal to 74 for 1X video watermark emission format (1X System) and may be less than or equal to 194 for 2X video watermark emission format (2X System).

When channel_ID_present is equal to 1 and content_ID_present is equal to 1 and valid_until_present is equal to 0, the value of content_ID_length may be less than or equal to 80 for 1X video watermark emission format (1X System) and may be less than or equal to 200 for 2X video watermark emission format (2X System).

The value of the constraints may depend on watermark emission format. As an example, the following constraints apply:

At least one of content_ID_present or channel_ID_present may have a value equal to '1'.

When channel_ID_present is equal to 0 and content_ID_present is equal to 1 and valid_until_present is equal to 1, the value of content_ID_length may be less than or equal to 71 for 1X video watermark emission format (1X System) and may be less than or equal to 191 for 2X video watermark emission format (2X System).

When channel_ID_present is equal to 0 and content_ID_present is equal to 1 and valid_until_present is equal to 0, the value of content_ID_length may be less than or equal to 77 for 1X video watermark emission format (1X System) and may be less than or equal to 197 for 2X video watermark emission format (2X System).

When channel_ID_present is equal to 1 and content_ID_present is equal to 1 and valid_until_present is equal to 1, the value of content_ID_length may be less than or equal to 66 for 1X video watermark emission format (1X System) and may be less than or equal to 186 for 2X video watermark emission format (2X System).

When channel_ID_present is equal to 1 and content_ID_present is equal to 1 and valid_until_present is equal to 0, the value of content_ID_length may be less than or equal to 72 for 1X video watermark emission format (1X System) and may be less than or equal to 192 for 2X video watermark emission format (2X System).

Event is a timed notification to a receiver software or to an application indicating that some action is to be taken.

Event Stream is a Stream of events.

A broadcast station may send Events via broadcast channel or broadband to a receiver. The Events may be sent dynamically as required. As an example Events may be sent to signal to the receiver to start or stop a particular application associated with current program. Other example Events may include an event which carries some data required by a running application. These are just examples and other type of data may be sent by events.

delivery_protocol_type is a 4-bit field may signify the delivery of the service to which the dynamic event applies. For example the delivery protocol may be Motion Pictures Experts Group (MPEG) Media Transport Protocol (MMTP) or Real-time Object delivery over Unidirectional Transport (ROUTE) which may operate on top of Dynamic Adaptive Streaming of HTTP (DASH). MMTP is described in ISO/IEC: ISO/IEC 23008-1, "Information technology-High efficiency coding and media delivery in heterogeneous environments-Part 1: MPEG media transport (MMT)," which is incorporated by reference herein in its entirety. DASH is further described in "ISO/IEC 23009-1 Dynamic adaptive streaming over HTTP (DASH)—Part 1: Media presentation description and segment formats," which is incorporated by reference herein in its entirety.

scheme_id_uri_strlen is an 8-bit unsigned integer field that gives the length of the scheme_id_uri_string field in bytes.

scheme_id_uri_string is a string that gives the schemeIdUri for the Event stream of the Event. specifies a URI to identify the scheme. The semantics of this element are specific to the scheme specified by this attribute. The schemeIdUri may be a Uniform Resource Number (URN) or Uniform Resource Locator (URL). URN and URL are defined in Internet Engineering Task Force (IETF) Request for Comments RFC 3986 available at https://tools.ietf.org/html/rfc3986 which is incorporated by reference in its entirety.

value_strlen is an 8-bit unsigned integer field gives the length of the value_string field in bytes.

value_string is a string that gives the value for the Event stream of the Event.

timescale is a 32-bit unsigned integer that gives the time scale for the Event Stream of the event, in ticks/second as defined in the MPEG DASH standard described in "ISO/IEC 23009-1 Dynamic adaptive streaming over HTTP (DASH)—Part 1: Media presentation description and segment formats", to be used for the duration field.

presentation_time is a 32-bit unsigned integer that indicates the presentation time of the Event, as the least-significant 32 bits of the count of the number of seconds since Jan. 1, 1970 00:00:00, International Atomic Time (TAI).

presentation_time_ms is a 10-bit unsigned integer in the range 0 to 999 that indicates the milliseconds offset from the time indicated in presentation_time, such that the formula presentation_time+(presentation_time_ms/1000) yields the actual presentation time to the nearest 1 millisecond.

duration is a 32-bit unsigned integer that gives the duration of the Event, in the time scale of the Event.

id is a 32-bit unsigned integer field identifier (ID) for the Event, unique within the Event Stream.

data_length is an 8-bit integer that gives the length of the data field in bytes.

data is a field that contains data needed for responding to the event, if any. The format and use of the data is determined by the Event Stream specification, which will be known to any application registering to receive the Event for any Event targeted to applications.

reserved1_field_length is a 8-bit unsigned integer field may give the length in bytes of the reserved1 field, which immediately follows this field.

reserved1 is reserved for future use.

In an example the user defined content ID is included in data field.

In an example the string in scheme_id_uri_string identifies that the data field includes the user defined content ID.

In an example the string in scheme_id_uri_string and value_string identifies that the data field includes the user defined content ID.

In an example, the scheme_id_uri_string may be specified as a URI. If URN's are used for scheme_id_uri_string for user defined content ID then they may have to be registered with a registration authority to avoid collisions. In an example, the URI indicating scheme_id_uri_string for user defined content ID includes information that indicates its validity period (e.g. a representation of time such as month, year etc.). If a URL is used to specify scheme_id_uri_string for a user defined content ID then it may include a representation of time to indicate the scheme_id_uri_string validity period. The scheme_id_uri_string for a user defined content ID may just be an identifier used by a user (such as a broadcaster) for self-identification. The value of scheme_id_uri_string field for a user defined content ID may describe how information in data is structured. The value of scheme_id_uri_string field may identify a code space corresponding to user defined content ID. The value of scheme_id_uri_string field may allow avoiding collision of content ID values—by interpreting them based on different scheme_id_uri_string field values when used by different users (such as different broadcasters).

In some examples, a receiver may choose to include the content_ID_type when performing usage reporting.

In some examples, a receiver may choose to include information about the source of the content ID, e.g., video watermark, audio watermark, over the air transmission, etc., while performing usage reporting.

Moreover, each functional block or various features of the base station device and the terminal device used in each of the aforementioned embodiments may be implemented or executed by a circuitry, which is typically an integrated circuit or a plurality of integrated circuits. The circuitry designed to execute the functions described in the present specification may comprise a general-purpose processor, a digital signal processor (DSP), an application specific or general application integrated circuit (ASIC), a field programmable gate array (FPGA), or other programmable logic devices, discrete gates or transistor logic, or a discrete hardware component, or a combination thereof. The general-purpose processor may be a microprocessor, or alternatively, the processor may be a conventional processor, a controller, a microcontroller or a state machine. The general-purpose processor or each circuit described above may be configured by a digital circuit or may be configured by an analogue circuit. Further, when a technology of making into an integrated circuit superseding integrated circuits at the present time appears due to advancement of a semiconductor technology, the integrated circuit by this technology is also able to be used.

It is to be understood that the claims are not limited to the precise configuration and components illustrated above. Various modifications, changes and variations may be made in the arrangement, operation and details of the systems, methods, and apparatus described herein without departing from the scope of the claims.

The invention claimed is:

1. A method of processing a data stream comprising:
    (a) receiving said data stream including a watermark message encoded within said data stream;
    (b) extracting a watermark message identification indicating a type of message included in said watermark message;
    (c) decoding the watermark message identification to determine whether the type of message is an emergency alert message or a content identification message;
    (d) based on the decoded watermark message identification extracting, from said watermark message, an expiry time value; and
        accessing supplementary content based upon said expiry time value; and
    (e) based on the decoded watermark message identification, extracting, from said watermark message and as information for identifying content, a first flag, and a second flag, the first flag indicating whether fields associated with a content ID are present in the watermark message, the second flag indicating whether fields associated with a channel ID are present in the watermark message,
        further extracting, as the information for identifying content and in a case where the first flag indicates that the fields associated with content ID are present, a third flag which indicates whether a field associated with validity end time of the content ID is present, and
        accessing supplementary content based upon said information for identifying content.

2. The method of claim 1 wherein said supplemental content is accessed based upon a broadband network connection.

3. The method of claim 1 wherein said watermark message is an audio watermark.

4. The method of claim 1 wherein said watermark message is a video watermark.

5. A receiver for processing a data stream comprising:
    (a) said receiver receiving said data stream including a watermark message encoded within said data stream;
    (b) said receiver extracting a watermark message identification indicating a type of message included in said watermark message;
    (c) in a case where said watermark message identification indicates that the type of message is an emergency alert message,
        said receiver extracting, from said emergency alert message, an expiry time value; and
        said receiver accessing supplementary content based upon said expiry time value; and
    (d) in a case where said watermark message identification indicates that the type of message is a content identification message,
        said receiver extracting, from said content identification message and as information for identifying content, a first flag, and a second flag, the first flag indicating whether fields associated with a content ID are present in the content identification message, the second flag indicating whether fields associated with a channel ID are present in the content identification message,
        said receiver further extracting, as the information for identifying content and in a case where the first flag indicates the fields associated with content ID are present, a third flag which indicates whether a field associated with validity end time of the content ID is present, and
        said receiver accessing supplementary content based upon said information for identifying content.

6. The receiver of claim 5 wherein said supplemental content is accessed based upon a broadband network connection.

7. The receiver of claim 5 wherein said watermark message is an audio watermark.

8. The receiver of claim 5 wherein said watermark message is a video watermark.

* * * * *